US012706565B2

(12) United States Patent
Kroyzer et al.

(10) Patent No.: US 12,706,565 B2
(45) Date of Patent: Aug. 11, 2026

(54) CALIBRATION OF PIVOTABLE PV MODULES USING MINIMUM-IRRADIANCE ORIENTATIONS

(71) Applicant: Nextpower LLC, Fremont, CA (US)

(72) Inventors: Gil Kroyzer, Jerusalem (IL); Israel Kroizer, Jerusalem (IL); Morag Am Shallem, Jerusalem (IL); Michal Arieli, Rehovot (IL); Joseph Schwarzbach, Jerusalem (IL)

(73) Assignee: Nextpower LLC, Fremont, CA (US)

( * ) Notice: Subject to any disclaimer, the term of this patent is extended or adjusted under 35 U.S.C. 154(b) by 377 days.

(21) Appl. No.: 18/543,822

(22) Filed: Dec. 18, 2023

(65) Prior Publication Data

US 2025/0202424 A1 Jun. 19, 2025

(51) Int. Cl.

*H02S 50/00* (2014.01)
*G01B 21/22* (2006.01)
*H02S 20/32* (2014.01)

(52) U.S. Cl.

CPC .............. *H02S 50/00* (2013.01); *G01B 21/22* (2013.01); *H02S 20/32* (2014.12)

(58) Field of Classification Search

CPC .......... H02S 50/00; H02S 20/32; G01B 21/22
See application file for complete search history.

(56) References Cited

U.S. PATENT DOCUMENTS

| | | | | |
|---|---|---|---|---|
| 3,708,667 A * | 1/1973 | Denis | G01J 5/12 374/E17.001 |
| 7,166,825 B1 * | 1/2007 | Smith | G01N 21/274 250/203.4 |
| 10,281,552 B2 * | 5/2019 | Augustyn | F24S 30/425 |
| 11,017,561 B1 * | 5/2021 | Sonn | G06T 7/70 |
| 11,824,363 B2 * | 11/2023 | Kroyzer | H02J 3/004 |
| 11,914,404 B2 * | 2/2024 | Ma | F24S 50/80 |
| 12,025,349 B2 * | 7/2024 | Kesler | H02S 20/32 |
| 12,101,059 B2 * | 9/2024 | Leary | G01K 13/00 |
| 12,375,023 B2 * | 7/2025 | Kroyzer | H02S 20/10 |
| 2012/0152313 A1 * | 6/2012 | Hinman | F24S 30/455 136/246 |
| 2022/0043096 A1 * | 2/2022 | Marsh | G01S 3/7861 |

* cited by examiner

*Primary Examiner* — Thomas D Alunkal

(74) *Attorney, Agent, or Firm* — Fredrikson & Byron, P.A.

(57) ABSTRACT

A method of calibrating an angular position of a PV module in a solar energy system includes calculating a set of respective minimum-irradiance angles for a plurality of times during a travel period, pivoting the PV module through an actual travel path having an angular offset from a target travel path that is selected to intercept, at least once, a range of angles within a selected angular error away from a respective minimum-irradiance angle, and determining the angular offset, based on respective irradiance-value measurements obtained at a plurality of pivot angles along the actual travel path, where each respective irradiance-value measurement can include irradiance and/or a parameter characterizing electricity produced from the irradiance.

20 Claims, 14 Drawing Sheets

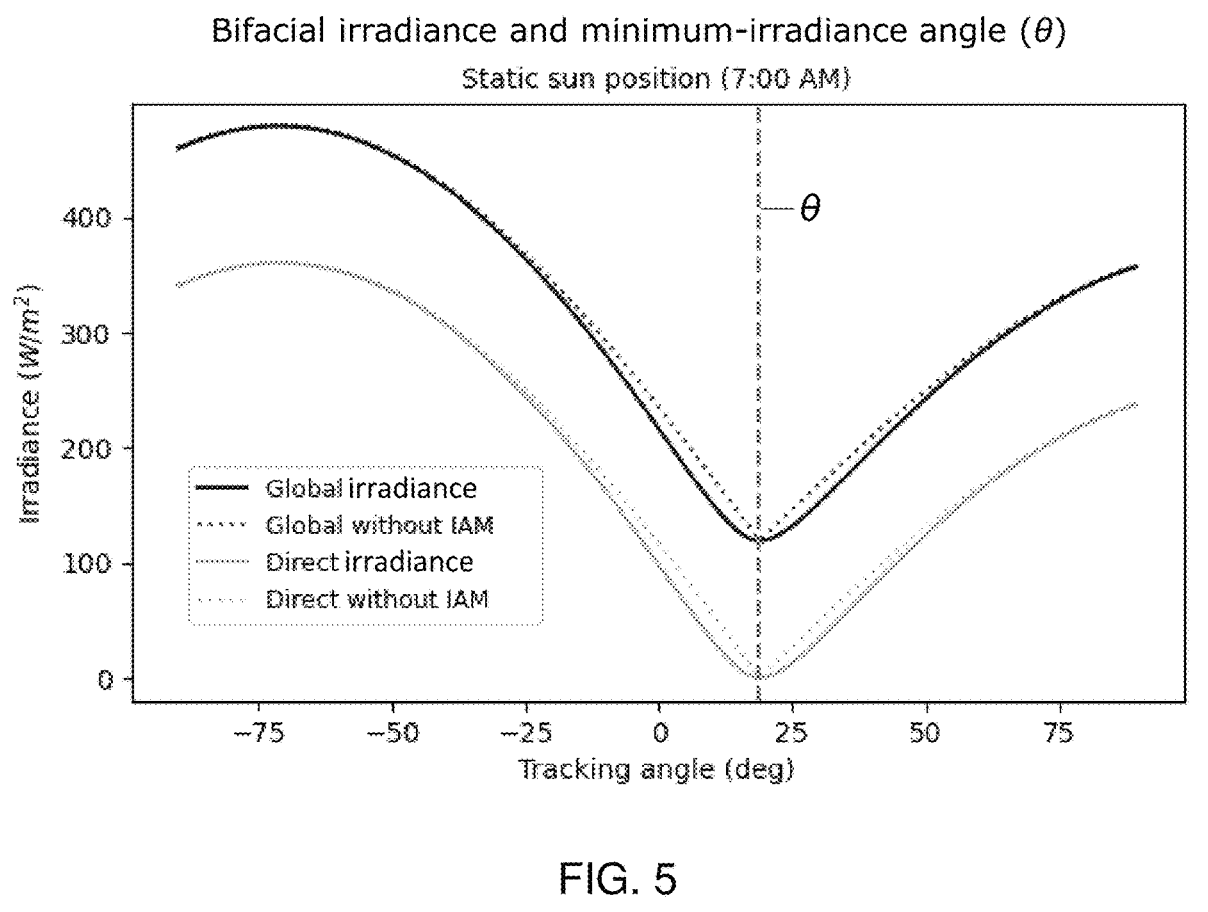

Bifacial irradiance and minimum-irradiance angle ($\theta$)

Static sun position (7:00 AM)

$\theta$

Irradiance ($W/m^2$)

400

300

200

100

0

Global irradiance

Global without IAM

Direct irradiance

Direct without IAM

−75 −50 −25 0 25 50 75

Tracking angle (deg)

FIG. 5

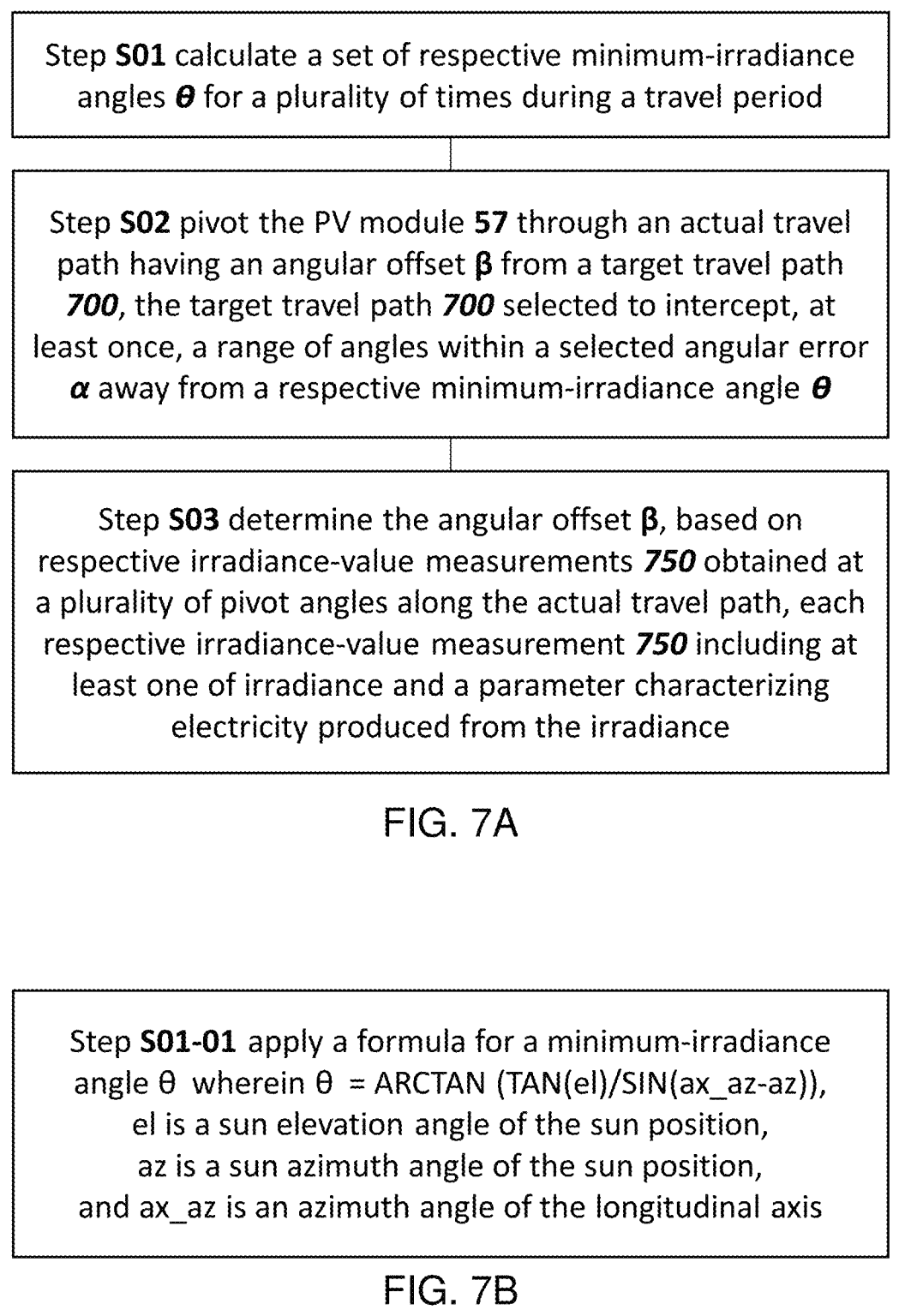

Step S01 calculate a set of respective minimum-irradiance angles *θ* for a plurality of times during a travel period Step S02 pivot the PV module 57 through an actual travel path having an angular offset β from a target travel path *700*, the target travel path *700* selected to intercept, at least once, a range of angles within a selected angular error *α* away from a respective minimum-irradiance angle *θ*

Step S03 determine the angular offset β, based on respective irradiance-value measurements *750* obtained at a plurality of pivot angles along the actual travel path, each respective irradiance-value measurement *750* including at least one of irradiance and a parameter characterizing electricity produced from the irradiance

FIG. 7A

Step S01-01 apply a formula for a minimum-irradiance angle θ wherein θ = ARCTAN (TAN(el)/SIN(ax_az-az)), el is a sun elevation angle of the sun position, az is a sun azimuth angle of the sun position, and ax_az is an azimuth angle of the longitudinal axis

FIG. 7B

Step S03-01 calculate, for each of one or more fixed offsets $\boldsymbol{\delta_i}$ from the target travel path *700*, a parallel offset path *710*$_i$ comprising a set of respective path-offset angles for the plurality of times, each respective path-offset angle being offset, by the fixed offset $\boldsymbol{\delta_i}$ from a corresponding target-path angle along the target travel path *700*

Step S03-02 fit the respective irradiance-value measurements *750* obtained at the plurality of pivot angles along the actual travel path to a best-fit parallel offset path *710*$_{BEST}$ based on projected irradiance values for the respective path-offset angles for the plurality of times Step S03-03 assign the fixed offset of the best-fit parallel offset path *710*$_{BEST}$ as the angular offset $\boldsymbol{\beta}$

FIG. 10

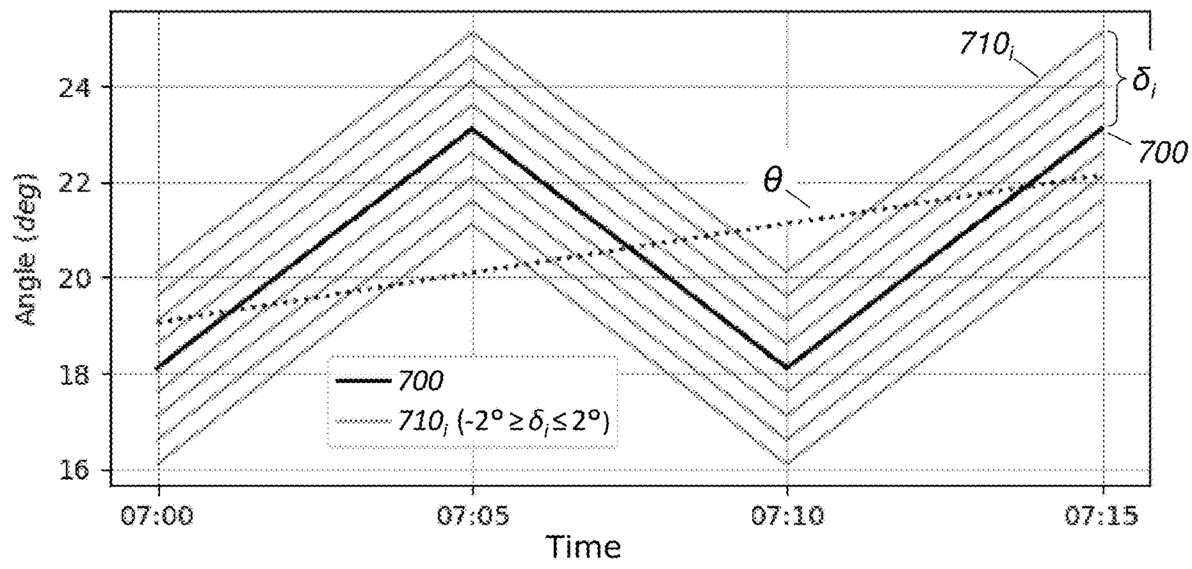

FIG. 11A

Step S03-11 calculate an offset path *720* from the respective irradiance-value measurements *750* obtained at the plurality of pivot angles along the actual travel path, wherein a slope of the offset path *720* is constrained to equal a slope of the target travel path *700* or of a corresponding portion thereof Step S03-12 assign the offset *δ* of the offset path *720* from the target travel path 700 as the angular offset β

FIG. 12

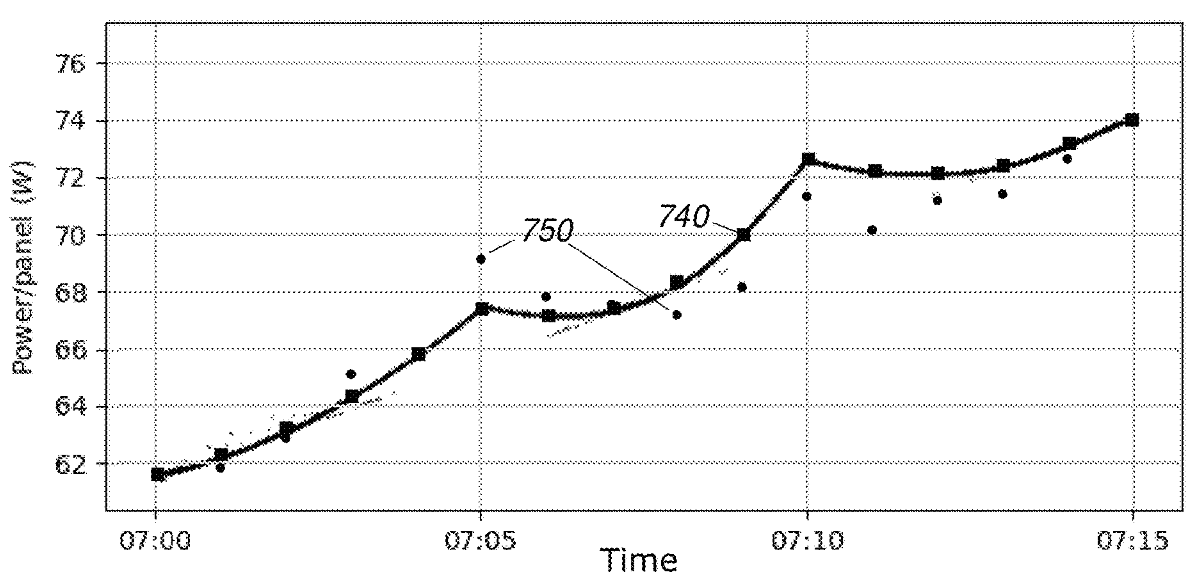

FIG. 13A

Step S03-21 compare respective irradiance-value measurements *750* obtained at the plurality of pivot angles along the actual travel path with a set of projected irradiance values *740* for the set of respective minimum-irradiance target angles *θ*

Step S03-22 calculate the angular offset β based on the comparing

Step S03-31 isolate estimated irradiance-value measurements *750* for the plurality of pivot angles along the actual travel path from the blended irradiance-value measurements

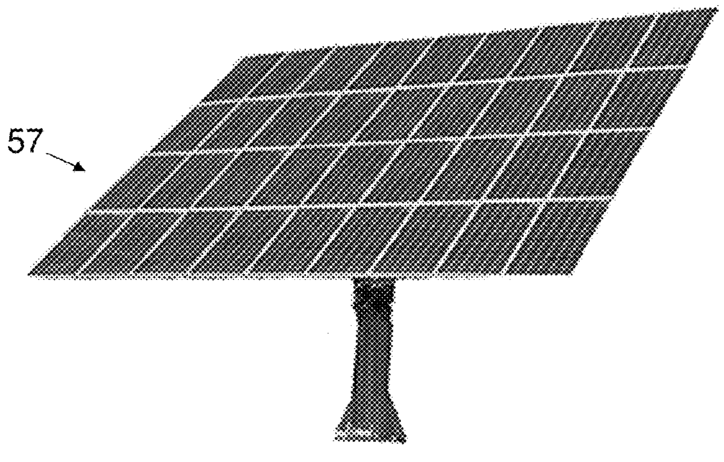

FIG. 19

Step S11 calculate at least one minimum-irradiance orientation $\varphi$, $\psi$ for each of a plurality of respective times during a travel period Step S12 pivot the PV module 57 through a set of actual orientations, each having an angular offset β in at least one plane from a respective target orientation, the respective target orientations selected to include at least one minimum-irradiance orientation $\varphi$, $\psi$ Step S13 determine the angular offset β in the at least one plane, based on respective irradiance-value measurements *750* obtained at a plurality of actual orientations, each respective irradiance-value measurement 750 including at least one of irradiance and a parameter characterizing electricity produced from the irradiance

FIG. 20

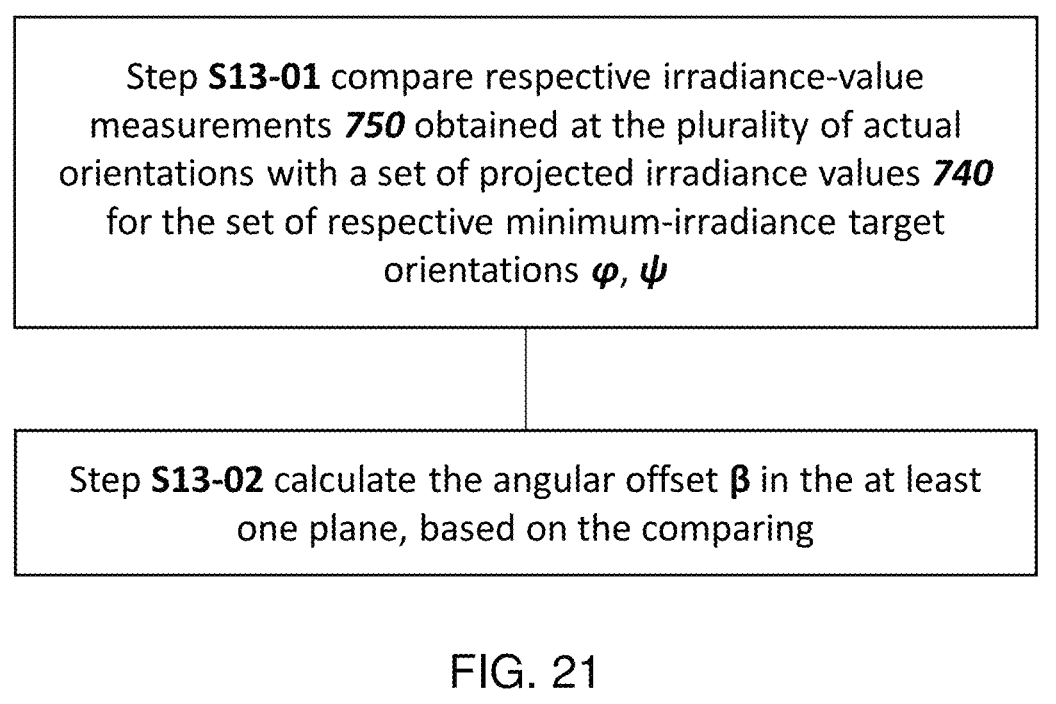

Step S13-01 compare respective irradiance-value measurements *750* obtained at the plurality of actual orientations with a set of projected irradiance values *740* for the set of respective minimum-irradiance target orientations $\boldsymbol{\varphi}$, $\boldsymbol{\psi}$ Step S13-02 calculate the angular offset $\boldsymbol{\beta}$ in the at least one plane, based on the comparing

FIG. 21

CALIBRATION OF PIVOTABLE PV MODULES USING MINIMUM-IRRADIANCE ORIENTATIONS

FIELD OF THE INVENTION

The present invention relates to solar energy systems and in particular to devices and methods for calibrating the positions of tracking photovoltaic (PV) systems, by configuring the tracking systems to pivot the PV assemblies proximate to calculated minimum-irradiance orientations.

BACKGROUND

Achieving a diversified low-carbon emissions energy economy has been limited by economic and technological limitations. Solar energy systems comprising photovoltaic (PV) modules are commonly deployed to capture energy from both direct and diffuse (including reflected) solar irradiance. Tracking PV systems are deployed in which PV modules are pivoted to reduce optical losses from the direct irradiance component, including the so-called cosine loses wherein the energy absorbed is a function of the cosine of the angle between the incidence vector and a normal vector of the PV module.

PV modules serve to generate electricity when solar illumination is incident upon the panels. Generated electricity is typically fed into an electrical grid of the city/locality.

A substantial majority of the solar energy converted to electricity is from the direct component of the general irradiance, while only a minority comes from the diffuse component. It is known in the industry that there is value in calibrating the respective positions of PV modules in tracking systems to more reliably maximize incidence of the direct component. Some commercial applications use inclinometers but such instruments can be too expensive for small, lightweight tracking PV systems. Existing calibration methods involve attempting to determine angular offsets between actual orientations and target orientations while tracking the sun around the maximum irradiance values. However, such methods are not efficient, because the value of actual irradiance remains relatively unchanged at angles of orientation around the maximum-irradiance orientation.

SUMMARY

A method is disclosed, according to embodiments of the present invention, for calibrating an angular position of a photovoltaic (PV) module in a solar energy system. According to the method, the solar energy system further comprises a motor assembly arranged to pivot the PV module about a longitudinal axis thereof through respective pivot angles, and a control system configured to regulate the pivoting. The method comprises: (a) calculating a set of respective minimum-irradiance angles for a plurality of times during a travel period; (b) pivoting the PV module through an actual travel path having an angular offset from a target travel path, the target travel path selected to intercept, at least once, a range of angles within a selected angular error away from a respective minimum-irradiance angle; and (c) determining the angular offset, based on respective irradiance-value measurements obtained at a plurality of pivot angles along the actual travel path, each respective irradiance-value measurement including at least one of irradiance and a parameter characterizing electricity produced from the irradiance.

In some embodiments, the determining of the angular offset can include: (i) calculating, for each of one or more fixed offsets from the target travel path, a parallel offset path comprising a set of respective path-offset angles for the plurality of times, each respective path-offset angle being offset, by the fixed offset, from a corresponding target-path angle along the target travel path, (ii) fitting the respective irradiance-value measurements obtained at the plurality of pivot angles along the actual travel path to a best-fit parallel offset path, based on projected irradiance values for the respective path-offset angles for the plurality of times, and (iii) assigning the fixed offset of the best-fit parallel offset path as the angular offset. In some embodiments, the fixed offsets can be selected to not exceed the selected angular error. In some embodiments, the selected angular error can be between −5° and +5°, and the fixed offsets can be between −5° and +5°, or between 4° and +4°, or between −3° and +3°, or between −2° and +2°. In some embodiments, the one or more fixed offsets can include at least two fixed offsets, and the at least two fixed offsets can include at least one positive fixed offset and at least negative fixed offset.

In some embodiments, the angular offset can be determined from differences between the respective irradiance-value measurements obtained at the plurality of pivot angles along the actual travel path and projections of irradiance-value measurements at corresponding target-path angles along the target travel path.

In some embodiments, the determining of the angular offset can include: (i) calculating an offset path from the respective irradiance-value measurements obtained at the plurality of pivot angles along the actual travel path, wherein a slope of the offset path is constrained to equal a slope of the target travel path or of a corresponding portion thereof, and (ii) assigning an offset of the offset path from the target travel path as the angular offset.

In some embodiments, the target-path angles along the target travel path can consist of monotonically increasing angles or monotonically decreasing angles.

In some embodiments, the target-path angles along the target travel path can include at least one sequence of increasing angles and at least one sequence of decreasing angles.

In some embodiments, it can be that (i) the target travel path can comprise the set of respective minimum-irradiance angles, and that (ii) the determining of the angular offset includes (A) comparing respective irradiance-value measurements obtained at the plurality of pivot angles along the actual travel path with a set of projected irradiance values for the set of respective minimum-irradiance target angles, and (B) calculating the angular offset based on the comparing.

In some embodiments, the calculating of the set of respective minimum-irradiance angles can include applying a formula for a minimum-irradiance angle θ wherein θ=−ARCTAN (TAN (el)/SIN (az−ax_az)), el is a sun elevation angle of the sun position, az is a sun azimuth angle of the sun position, and ax_az is an azimuth angle of the longitudinal axis. In some embodiments, the formula can also include a slope of the PV module.

In some embodiments, it can be that (i) the PV module pivoted through said actual travel path is one of a plurality of PV modules in electrical connection with electronic circuitry comprising an inverter, and (ii) the respective irradiance-value measurements are obtained from the electronic circuitry and comprise blended irradiance-value measurements for the plurality of PV modules. In some embodiments, determining of the angular offset can be based on blended irradiance-value measurements for the PV module pivoted through said actual travel path and for at least one other PV module. In some embodiments, the determining can comprise isolating estimated irradiance-value measurements (for the single PV module undergoing calibration) for the plurality of pivot angles along the actual travel path from the blended irradiance-value measurements.

In some embodiments, a control system for a solar energy system can be configured to carry out any of the methods disclosed above. In some embodiments, a solar energy system can comprise an array of photovoltaic (PV) modules, one or more motor assemblies arranged to pivot the PV modules about respective longitudinal axes thereof through respective pivot angles, and the control system.

A method is disclosed, according to embodiments of the present invention, for calibrating an angular position of a photovoltaic (PV) module in a solar energy system. According to the method, the solar energy system further comprises a motor assembly arranged to pivot the PV module about at least one axis thereof through respective orientations, and a control system configured to regulate the pivoting. The method comprises: (a) calculating at least one minimum-irradiance orientation for each of a plurality of respective times during a travel period; (b) pivoting the PV module through a set of actual orientations each having an angular offset in at least one plane from a respective target orientation, the respective target orientations selected to include at least one minimum-irradiance orientation; and (c) determining the angular offset in the at least one plane, based on respective irradiance-value measurements obtained at a plurality of actual orientations, each respective irradiance-value measurement including at least one of irradiance and a parameter characterizing electricity produced from the irradiance.

In some embodiments, the angular offset can be determined from differences between the respective irradiance-value measurements obtained at the plurality of actual orientations and projections of irradiance at corresponding target orientations.

In some embodiments, it can be that (i) the target orientations comprise the set of at least one minimum-irradiance orientation for each of the plurality of respective times, and that (ii) the determining of the angular offset in the at least one plane includes (A) comparing respective irradiance-value measurements obtained at the plurality of actual orientations with a set of projected irradiance values for the set of respective minimum-irradiance target orientations, and (B) calculating the angular offset in the at least one plane, based on the comparing.

In some embodiments, a target orientation can be changed during the travel period in response to one or more obtained irradiance-value measurements.

In some embodiments, the set of actual orientations can be changed during the travel period in response to one or more obtained irradiance-value measurements.

In some embodiments, a control system for a solar energy system can be configured to carry out any of the methods disclosed above. In some embodiments, a solar energy system can comprise an array of photovoltaic (PV) modules, one or more motor assemblies arranged to pivot the PV module about at least one axis thereof through respective orientations, and the control system.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings:

FIG. 5 shows a graph of irradiance vs. angle of orientation for a bifacial PV module in accordance with embodiments of the present invention.

FIGS. 7A and 7B show flowcharts of methods and method steps for calibrating an angular position of a PV module in a solar energy system, according to embodiments of the present invention.

FIG. 10 shows a flowchart of first exemplary method steps for determining the angular offset of an actual travel path from a target travel path, according to embodiments of the present invention.

FIG. 11A shows a schematic graph of module orientation angle vs. time, of an array of calculated parallel offsets for a target travel path, according to embodiments of the present invention.

FIG. 12 shows a flowchart of second exemplary method steps for determining the angular offset of an actual travel path from a target travel path, according to embodiments of the present invention.

FIG. 13A shows a schematic graph of irradiance-value measurements along an actual travel path vs. time, according to embodiments of the present invention.

FIG. 19 is a schematic illustration of a pivotable PV module in a solar energy system, according to embodiments of the present invention.

FIG. 20 shows a flowchart of a method for calibrating an angular position of a PV module in a solar energy system, according to embodiments of the present invention.

FIG. 21 shows a flowchart of method steps for determining the angular offset in at least one plane of an actual travel path from a target travel path, according to embodiments of the present invention.

DETAILED DESCRIPTION OF THE ILLUSTRATED EMBODIMENTS

Figure 1:
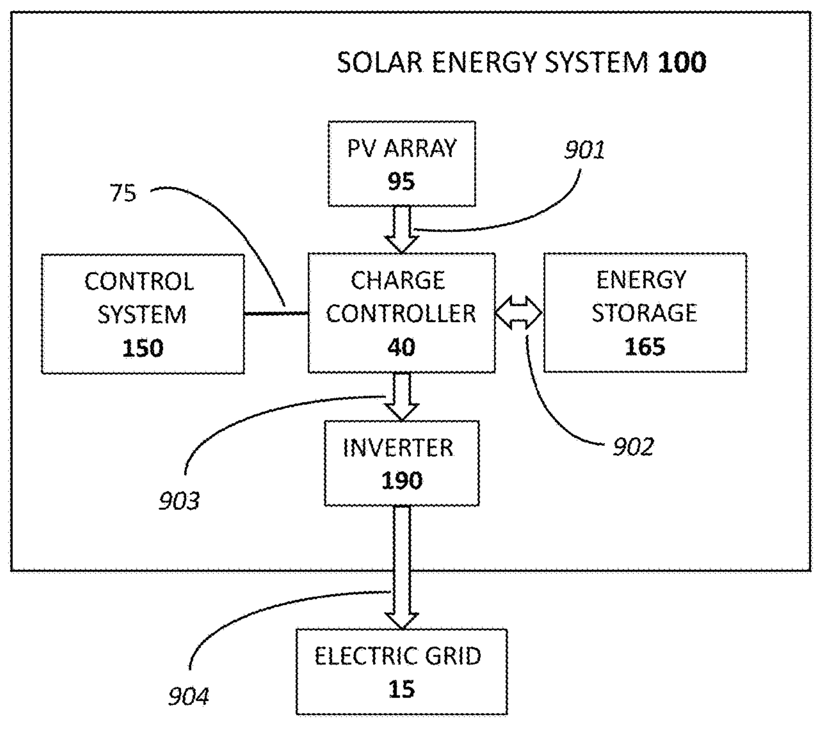
FIG. 1 shows a block diagram of a solar energy system, according to embodiments of the present invention.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements. Subscripted reference characters (e.g., $\mathbf{10}_1$ or $\mathbf{10}_A$) may be used to designate multiple separate appearances of elements of a single species, whether in a drawing or not; for example: $\mathbf{10}_1$ is a single appearance (out of a plurality of appearances) of element 10. The same elements can alternatively be referred to without subscript (e.g., 10 and not $\mathbf{10}_1$) when not referring to a specific one of the multiple separate appearances, i.e., to the species in general.

Embodiments disclosed herein relate to calibrating the angular position of a PV tracker in a solar energy system, based on determining an offset, or deviation, of actual irradiance values (of irradiance, or of one or more electrical parameters of electricity generated by the irradiance) from projected irradiance values at or near a minimum-irradiance orientation. As is further described hereinbelow, calibration of the angular position at or near the minimum-irradiance orientation can be more efficient and/or effective than performing the calibration at or near the maximum-irradiance orientation because of the shape of the typical irradiance vs. pivot-angle curve. According to the disclosed embodiments, irradiance measurements are obtained along a 'travel path' that includes one or more orientations projected to receive the lowest level of irradiance at the time. The methods and apparatuses disclosed herein are especially suitable for use in small, inexpensive, and/or lightweight trackers for which the use of inclinometers or other instrumentation providing real-time measurements or feedback, e.g., of actual tracker orientation, is impractical or too expensive.

The term 'solar energy system' as used herein means a system for generating electricity using an array of one or more PV modules. The system can include an inverter for converting the direct-current (DC) electricity generated by the PV modules to alternating current (AC) electricity, e.g., for delivery to an electricity grid, and/or other electronics, e.g., for optimizing voltage and current of a module or group or modules, e.g., an electrical string of modules.

A 'solar tracker', 'PV tracker', or simply 'tracker', is an arrangement that changes the orientation of the PV panels in response to commands from a controller. The orientation can change with respect to a single axis or to two axes, or, equivalently, in one plane or in two planes. Whenever direct solar irradiance is available, it is often desirable for the tracker to be oriented and incrementally pivoted to a set of maximum-irradiance orientations so as to capture, i.e., convert, the highest possible proportion of the direct irradiance falling on the panels over the course of a given period of time. In some instances, the tracker is oriented to capture and convert energy up to a given maximum or setpoint. Capture and conversion of the diffuse radiation component of the incident solar irradiance is considerably smaller than that of the direct component in clear-sky conditions, and therefore the tracking is less affected by the distribution of diffuse radiation. Any of the tracker-related terms used herein can also be understood, unless excluded by context, to include the PV modules being pivoted.

The expressions irradiance-value measurements, or irradiance-value projections, projected irradiance-values, and the like, as used herein and in the appended claims, refer to irradiance measurements or projections, according to the context, and/or to an electrical parameter such as power, current or voltage, of electricity generated by the irradiance, whether actual or projected.

According to embodiments disclosed herein, it can be desirable to pivot the tracker in directions substantially displaced from such maximum-irradiance orientations, in order to perform angular-position calibration of the tracker at or in proximity to a minimum-irradiance orientation. This can be performed, for example, during the early morning or late afternoon hours when the direct irradiance is relatively low and therefore any loss of potential electricity generation is relatively small.

A single-axis tracker is one that rotates PV panels around a single axis, usually rotating from facing east to facing west over the course of a day around a north-south axis. A double-axis, or two-axis, tracker is one that is designed to generally have the PV panels 'face' the sun directly at all times so as to capture and convert as much energy as possible from available direct irradiance by reducing the angle between a normal vector of the PV panels and incident direct irradiance to zero, or substantially zero, in not just one plane but all planes. Some double-axis trackers operate using Euler angles and do not, strictly speaking, rotate the PV panels about two Cartesian axes, but the results are substantially the same. The embodiments disclosed herein, other than the discussion of FIGS. 19-21, are described in terms of single-axis tracking, but their application, mutatis mutandis, to double-axis tracking, is within the scope of the present invention.

Figure 2:
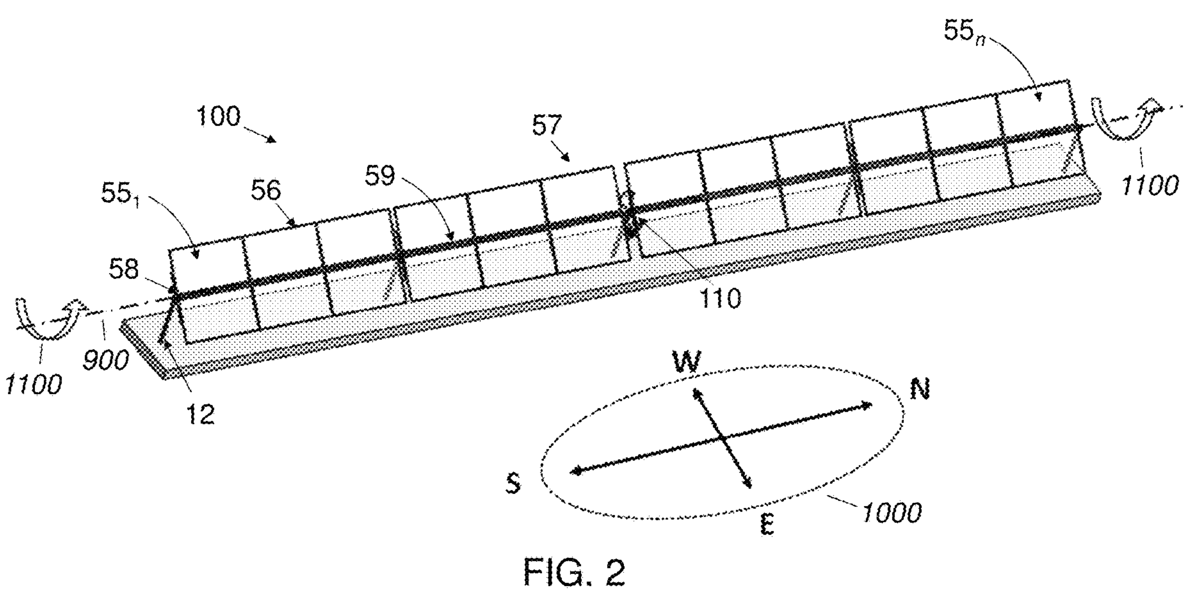
FIG. 2 shows a schematic layout of selected components of a solar energy system according to embodiments of the present invention.

Referring now to the figures, and in particular to FIG. 1, a solar energy system 100 according to embodiments includes a PV array 95 comprising one or more PV modules 57, a non-limiting example of which is shown in FIG. 2. In embodiments, the modules 57 of the PV array 95 includes a tracking component, i.e., a solar tracker, for increasing cumulative electricity generated over the course of a period of time. The solar tracker can include a drive system comprising a motor, and include and/or be directed by a controller (or, equivalently, control system).

The solar system 100 of FIG. 1 additionally includes an inverter 190 for conversion of DC electricity to AC. An inverter can include electronic circuitry, for example for synchronizing the phase, and for matching the voltage and frequency of the power output to those of the grid. Additional electronics associated with the inverter can be used to limit output of the PV modules and/or to optimize voltage and current.

FIG. 1 further illustrates a non-limiting example of a power flow scheme for the solar energy system 100: power generated by the PV array 95 flows to a charge controller 40 as indicated by arrow 901. Two-way power flow takes place between the charge controller 40 and an energy storage device 165, as indicated by two-way arrow 902. Power from the PV array 95 and the energy storage device 165 flows through the charge controller 40 to the inverter 190, as indicated by arrow 903. The inverter 190 can deliver energy to the electric grid 15, as indicated by arrow 904.

Referring now to FIG. 2, a solar energy system 100 according to embodiments, employing single-axis tracking, includes one or more PV modules 57. The PV module 57 of FIG. 2 includes n PV panels $\mathbf{55}_1$ through $\mathbf{55}_n$, joined to a support subassembly 58. The support subassembly 58 includes frames 56 for mounting the PV panels 55, and a central elongated member 59 to which the frames 56 are joined. The central elongated member 59 serves to transfer a torque to rotate the frames 56 as a unit together with the central elongated member 59 and the PV panels 55. The PV module 57 is rotated about a central longitudinal axis indicated in FIG. 2 by dashed line 900, and the rotation is schematically represented by arrows 1100. The PV module is rotatable in both directions, although it spends most of the day tracking east-to-west. The central elongated member 59 is pivotably supported by ground supports 12. As shown by axes 1000, the panels are facing generally east, indicating that FIG. 2 shows a morning orientation. The tracking of the PV module 57 is shown as being east-west tracking as is the case in the vast majority of current installations of PV modules, but the principles disclosed here are equally applicable to north-south tracking systems, mutatis mutandis. A drive system 110 according to embodiments includes a motor assembly and a pivot wheel or other mechanism for transmitting torque, and is also supported by a ground support 12. The drive system 110, as shown in FIG. 2, can be located in the center of the PV assembly 57. In other examples, a drive system 110 can be located elsewhere and/or configured differently than the example illustrated. In some embodiments, the drive system 110 is operable to rotate a pivot wheel positioned to rotate the central elongated member 59 and, with it, the PV module 57.

Figure 3:
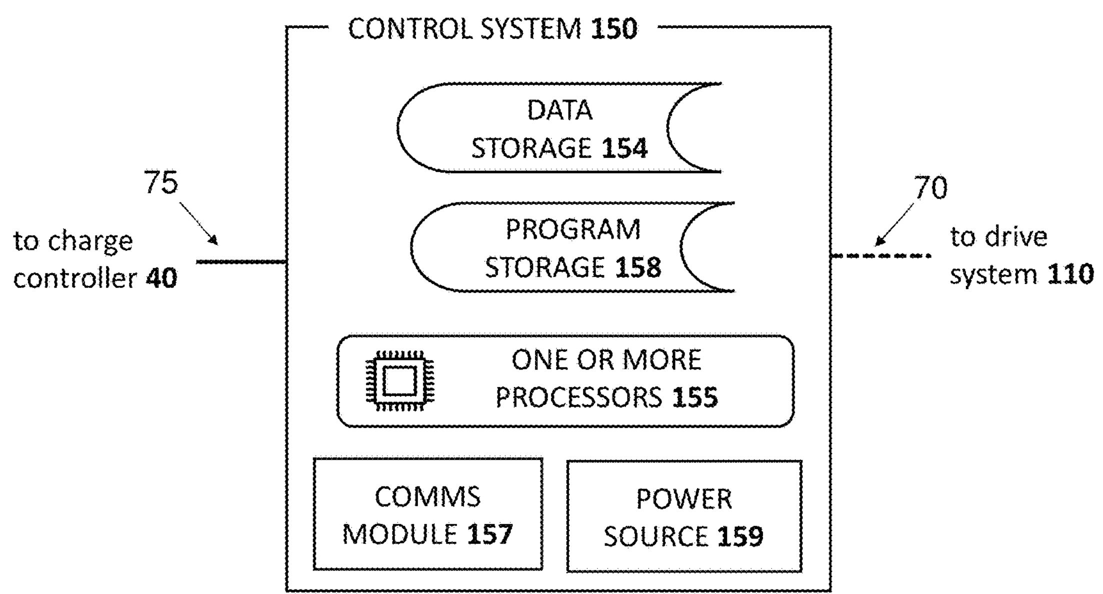
FIG. 3 shows a block diagram of a control system for a solar energy system, according to embodiments of the present invention.

A control system 150, (also called a 'controller') for a solar energy system 100, according to embodiments, is illustrated schematically in FIG. 3 to show selected components. The exemplary control system 150 of FIG. 3 includes one or more computer processors 155, a computer-readable storage medium 158, a communications module 157, and a power source 159. The computer-readable storage medium 158 can include transient and/or transient storage, and can include one or more storage units, all in accordance with desired functionality and design choices. The storage 158 can be used for any one or more of: storing program instructions, in firmware and/or software, for execution by the one or more processors 155 of the control system 150. In embodiments, the stored program instructions include program instructions for operating a solar energy system 100 in accordance with any of the embodiments disclosed herein. Data storage 154, if separate from storage 158, can be provided for historical data, e.g., actual irradiance and/or forecast values, e.g., forecasted or projected irradiance values, and other data related to the operation of the solar energy system 100. In some embodiments, the two storage modules 154, 158 form a single module. The communications module 159 is configured to establish communications links, e.g., via communication arrangements 70 with the drive system 110, and with the charge controller 40 via communications arrangements 75. In some embodiments, a control system 150 does not necessarily include all of the components shown in FIG. 2. The terms "communications arrangements" or similar terms such as "communications links" as used herein mean any wired connection or wireless connection via which data communications can take place. Non-limiting and non-exhaustive examples of suitable technologies for providing communications arrangements include any short-range point-to-point communication system such as IrDA, RFID (Radio Frequency Identification), TransferJet, Wireless USB, DSRC (Dedicated Short Range Communications), or Near Field Communication; wireless networks (including sensor networks) such as: ZigBee, EnOcean; Wi-fi, Bluetooth, TransferJet, or Ultra-wideband; and wired communications bus technologies such as CAN bus (Controller Area Network, Fieldbus, FireWire, HyperTransport and InfiniBand.

Figure 4:
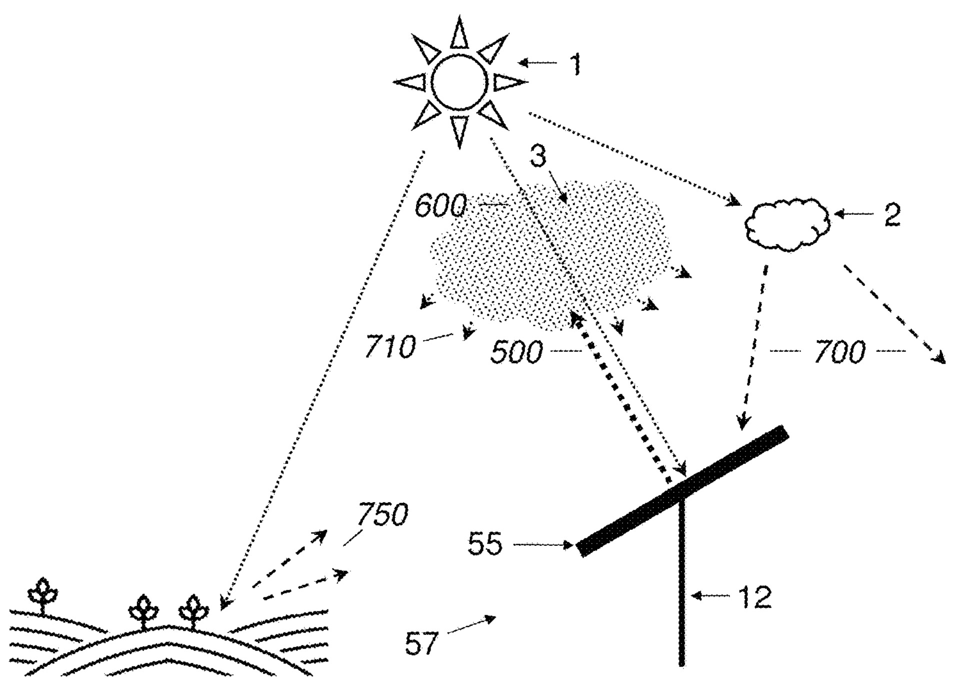
FIG. 4 is a schematic end-view illustration of a photovoltaic (PV) module exposed to different components of solar irradiance, according to embodiments of the present invention.

FIG. 4 illustrates the various components of solar irradiance with reference to a PV array. A module 57 is drawn schematically as an end view showing the ground support 12 and the PV panels 55. In the illustration of FIG. 4, the PV module 57 is oriented on-sun, i.e., faces the sun 1 directly on at least one axis, and thus the direct component 600 impinges upon the surface of the panels 55 at a right angle to the panels 55, i.e., the angle between the direct component 600 and a normal vector 500 of the panels 55 is zero, or substantially zero, or substantially zero in at least one plane. In a plane orthogonal to the illustrated plane of the figure, the vector 500 may or may not be parallel to the vector of the direct component 600 in a single-axis tracking system. Some of the direct radiation 600 of FIG. 4 reaches clouds 2 and the fraction that is not absorbed is scattered and further propagated as diffuse radiation 700. The direct irradiance 600, even in the absence of clouds, passes through particulate matter 3 in the atmosphere including, e.g., dust, water vapor, organic matter, etc., and a portion of the irradiation, e.g., 1-15%, or 5-10%, is scattered as diffuse radiation 710. Yet another type, or component, of diffuse radiation is reflected solar energy (albedo), shown in FIG. 4 as reflected off the surrounding landscape by diffuse radiation 750. Some 'bifacial' PV modules also convert solar irradiance received on the 'back side,' i.e., the side that does not normally face the sun, in order to convert additional solar radiation to electricity, e.g., reflected and diffused radiation 750. The diffuse component of solar irradiance wherever referred to hereinbelow can include any combination of cloud-diffused radiation 700, particulate-diffused radiation 710, and reflected radiation 750.

Throughout this disclosure and in the accompanying figures, certain notations are given the following meanings:

- θ indicates, for a single-axis tracker, a minimum-irradiance target angle, i.e., an angle projected to have the lowest total irradiance for a particular tracker, at a given time.
- α indicates a user-selected angular error representing a maximum angular error being considered for the calibration of the PV module.
- β indicates the angular offset between actual irradiance measurements and projected irradiance measurements. In some embodiments, the angular offset β is determined by performing a calibration method as disclosed herein, or by a controller performing such a calibration method.
- δ indicates an offset of an actual 'travel path' (a set of consecutive tracker orientations) from a target travel path between actual irradiance measurements and projected irradiance measurements for a given target (intended) orientation.
- φ, ψ indicate, for a two-axis tracker, a minimum-irradiance orientation, i.e., an orientation projected to have the lowest total irradiance for a particular tracker, at a respective time.

We now refer to FIGS. 5 and 6A-C, which, inter alia, illustrate the concept of using minimum-irradiance orientations for calibrating the angular position of a tracker.

FIG. 5 shows a graph of irradiance vs. tracking angle for an exemplary tracker comprising modules employing bifacial PV panels. The values shown by the graph of FIG. 5, as well as graphs presented in subsequent figures, relate to a specific location in northern Israel on a specific date close to the summer solstice, at 7:00 a.m., and thus are merely illustrative and in no way limiting in terms of sun position or irradiance. In the graph, the two upper curves show global (total) irradiance in Watts per square meter ($W/m^2$) vs. a tracking angle (in degrees), where 0 degrees is assigned to an orientation in which the PV modules face vertically, while the two lower curves show direct irradiance only. Each of the pair of curves includes a curve adjusted for losses due to the incident angle modifier, which are the angle-dependent optical losses due to a lengthening of the photonic path through the covering glass of PV panels. Thus, the graph shows that small changes in angular position around the maximum-irradiance orientation yield very small changes in irradiance, while similarly small changes in angular position around the minimum-irradiance orientation yield more dramatic changes in irradiance, making the calibration process disclosed herein more efficient. The minimum-irradiance orientation for the 7:00 a.m. 'snapshot' is indicated by the line marked θ.

Figure 6A:
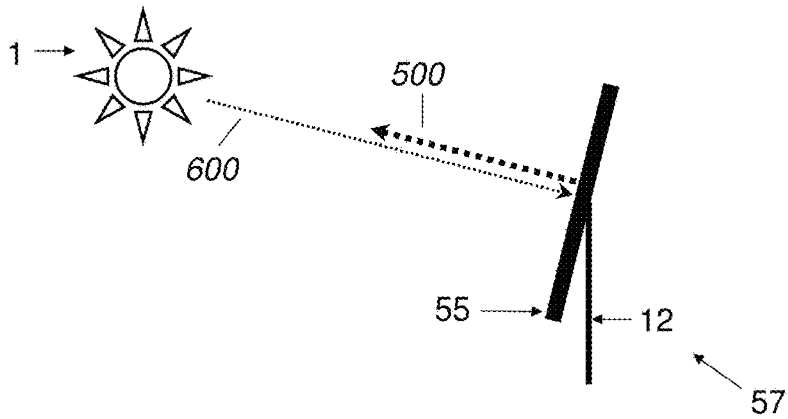
FIG. 6A is a schematic end-view illustration of a PV module pivoted to a maximum-irradiance orientation, according to embodiments of the present invention.
Figure 6B:
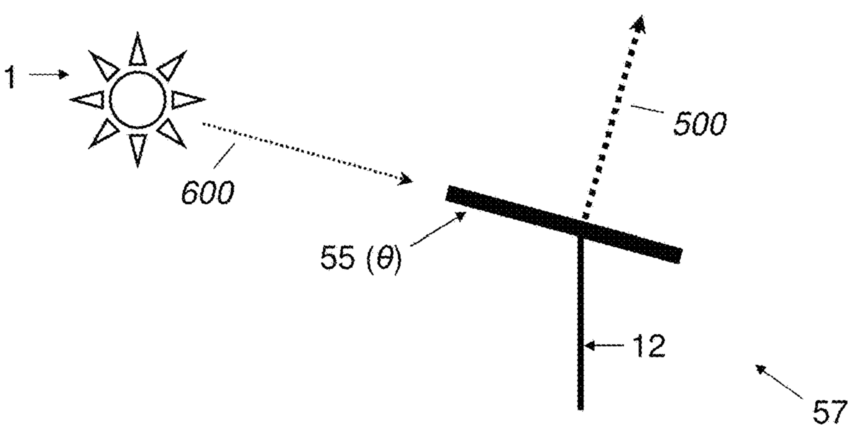
FIG. 6B is a schematic end-view illustration of a PV module pivoted to a minimum-irradiance orientation, according to embodiments of the present invention.

FIG. 6A shows, in schematic end view, a PV module 57 comprising a PV panel 55, in which the PV panel 55 is oriented so that the normal vector 500 is parallel to the incidence angle 600 of the direct irradiance. This maximum-irradiance orientation is similar to that shown in FIG. 4, adjusted for the substantially lower elevation of the sun 1 shown in FIGS. 6A-C. In contrast, the schematic drawing of FIG. 6B illustrates the PV module 57 pivoted to the minimum-irradiance orientation θ, and it can be seen that only an edge of the PV panel 55 receives solar radiation 600 directly from the sun 1.

In some embodiments, the controller 150 of the solar energy system is configured, e.g., programmed, to direct the PV module(s) 57 under its control to pivot to various target angles, including at times to the minimum-irradiance orientation θ, but does not receive any feedback as to the actual angular position of the PV module 57. Trackers, including, but not exhaustively, low-cost or lightweight trackers, may develop, between calibrations, an angular offset due to wind, precipitation, mechanical vibration or shock, or any other reason. Thus, it can happen that the controller 150 does not 'know' how the PV module is actually oriented. In a non-limiting example illustrated by FIG. 6C, the PV module 57 targeted to be oriented in the minimum-irradiance orientation θ can actually be oriented within an angular offset β on either side of the minimum-irradiance orientation θ, i.e., in the range between θ−β and θ+β. The symmetry of the angular-offset uncertainty is a non-limiting example, and in other examples, it can be that a tracker is known to develop angular offsets asymmetrically, i.e., the tracker might have a history a first angular offset β in one direction and a second angular offset smaller than—or larger than—the first angular offset β in the other direction.

Referring now to FIG. 7A, a method is disclosed for calibrating an angular position of a photovoltaic (PV) module in a solar energy system, e.g., the solar energy system 100 of FIG. 1. According to the method, the solar energy system 100 also comprises, in addition to the PV module 57, a motor assembly, e.g., drive system 110, arranged to pivot the PV module 57 about a longitudinal axis 1100 through respective pivot angles, and a control system 150 configured, e.g., programmed or programmable, to regulate the pivoting. As illustrated by the flow chart in FIG. 7A, the method comprises at least the three method steps S01, S02 and S03.

Step S01 includes calculating a set of respective minimum-irradiance angles θ for a plurality of times during a travel period. A 'travel period' is a period of time having a predetermined duration, or alternatively, an ad hoc duration, and used for pivoting, i.e., re-orienting, the PV module 57 to a variety of pivot angles useful, according to embodiments, for performing the calibration. The duration of a travel period can range from a few minutes, e.g., 3-5 minutes, to as long as 20-30 minutes, or even longer, and depends on, inter alia, the degree of precision desired for determining an angular offset β, the relative amplitude of the angular offset β, the design of the tracker, and other factors. A 15-minute travel time has been used for purposes of illustration in some of the figures. The number of specific times in the plurality of times can be selected based on any number of factors, as will be further discussed hereinbelow. As described hereinabove, a preferred approach for carrying out the method is to establish the travel period in the early morning or late afternoon, when the opportunity cost of electricity not generated by a PV module while performing the calibration is relatively low.

In some embodiments, as illustrated by the flow chart in FIG. 7B, the calculating of the set of respective minimum-irradiance angles θ of Step S01 is carried out in accordance with sub-step S01-01. The term 'sub-step' for some method steps is used to indicate that carrying out a particular method step is optionally included in carrying out another step, or is optionally included in an exemplary or optional approach to carrying out the other step.

Step S01-01 includes applying a formula for a minimum-irradiance angle θ wherein θ=ARCTAN (TAN (el)/SIN (ax_az−az)), el is a sun elevation angle of the sun position, az is a sun azimuth angle of the sun position, and ax_az is an azimuth angle of the longitudinal axis. In some embodiments, the formula for θ also includes a term representing the slope of the PV module 57.

In some embodiments, the calculating of the set of minimum-irradiance angles θ of Step S01 is carried out using a more or less sophisticated formula, or by look-up in a database, or by any other practical method.

Figure 6C:
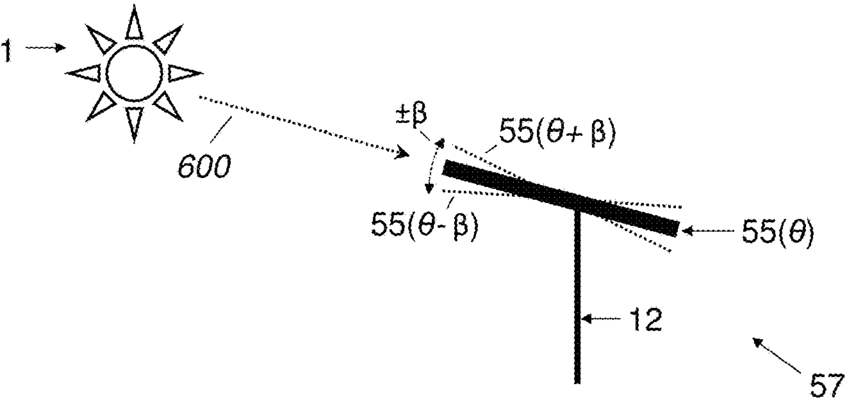
FIG. 6C shows the PV module of FIG. 6B within a range of angular offsets, according to embodiments of the present invention.

Referring again to the flowchart of FIG. 7A, Step S02 includes pivoting the PV module 57 through an actual travel path having an angular offset β from a target travel path 700. In other words, the goal is to pivot the PV module 57 along a target travel path 700, but it is to be assumed that the tracker is in need of calibration and that therefore there can be a nonzero angular offset β from the target travel path 700, e.g., as illustrated by FIG. 6C for an individual point along the target travel path 700. The result of the PV module 57 needing calibration is that the pivoting is along an actual, unintended or nontargeted travel path that has an angular offset β from a target travel path 700. The respective angular offsets of individual points along the target path 700 may differ, and in some embodiments, an overall angular offset β can be determined by one or more of the methods disclosed herein.

According to Step S02 of the method, the target travel path 700 is selected to intercept, at least once, a range of angles within a selected angular error α away from a respective minimum-irradiance angle θ. The selected angular error α represents the largest angular offset β anticipated by the controller or operator of the calibration process. In some embodiments, if the selected angular error α is too small and the actual angular offset β turns out to be larger than the selected angular error α, then it may be preferable to repeat the calibration with a larger selected angular error α, e.g., on a different day. Since Step S02 requires that target travel path 700 is selected to intercept a range of angles within a selected angular error α, an overly large selected angular error α could make the travel path unnecessarily long.

In some embodiments, the target-path comprises a set of angles spaced apart along the target travel path 700, consisting of monotonically increasing angles or monotonically decreasing angles. In some embodiments, the target-path angles spaced apart along the target travel path 700 include at least one sequence of increasing angles and at least one sequence of decreasing angles, e.g., monotonically increasing and decreasing, respectively. Schematically-drawn graphs of angle vs. time in FIGS. 8 and 9 respectively illustrate a target travel path 700 consisting of monotonically increasing angles and a target travel path 700 including at least one sequence of increasing angles and at least one sequence of decreasing angles.

Figure 8:
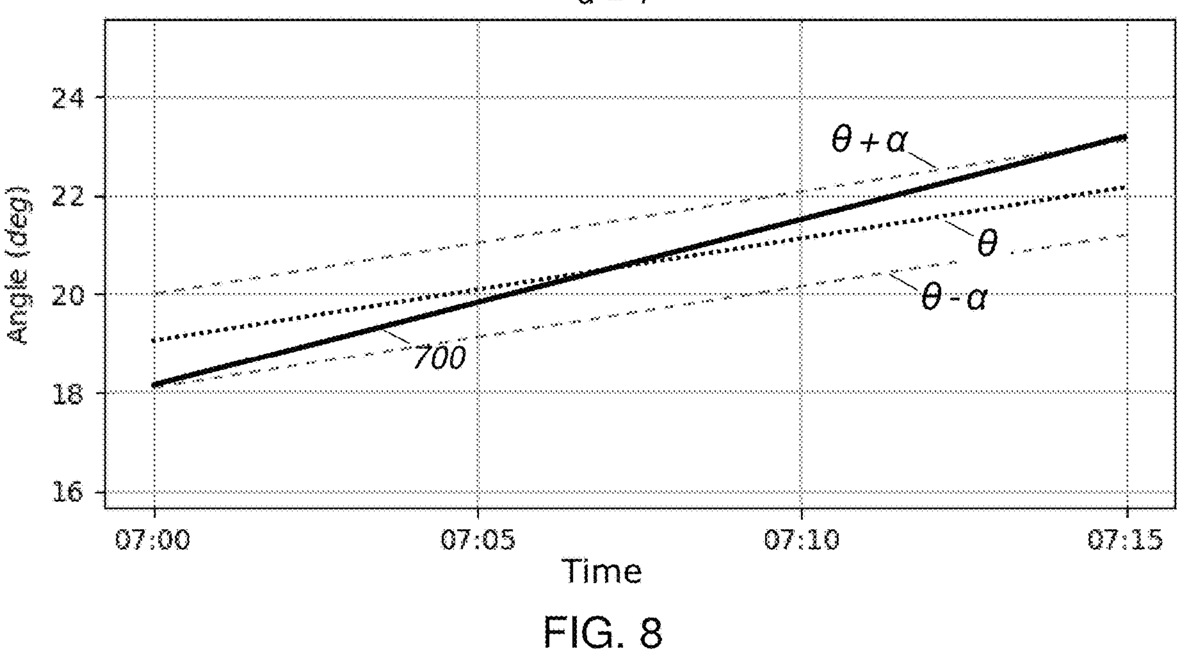
FIGS. 8 and 9 show schematic graphs of respective target travel paths intersecting a set of minimum-irradiance angles, according to embodiments of the present invention.

In the non-limiting example of FIG. 8, the set of minimum-irradiance angles θ (as the respective normal angles to the face of the PV modules) for the travel period 07:00-07:15 (7-7:15 am) starts at approximately 19° west of vertical and moves further west to 22° as the sun rises higher in the eastern sky. An angular offset error of ±2° is the maximum expected angular error, i.e., the selected angular error α, according to the example. Thus, in accordance with Step S02 of the method, the target travel path 700 of FIG. 8 consists of monotonically increasing angles and is selected to intercept the range of angles between θ−1° and θ+1°. In the non-limiting example of FIG. 9, the set of minimum-irradiance angles θ for the travel period 07:00-07:15 (7-7:15 am) again starts at approximately 19° west of vertical and moves further west to 22° as the sun rises higher in the eastern sky. An angular offset error of ±3° is the maximum expected angular error, i.e., the selected angular error α, according to the example. Thus, in accordance with Step S02 of the method, the target travel path 700 of FIG. 9 includes sequences of increasing angles and decreasing angles, and is selected to intercept the range of angles between θ−3° and θ+3°.

Figure 9:
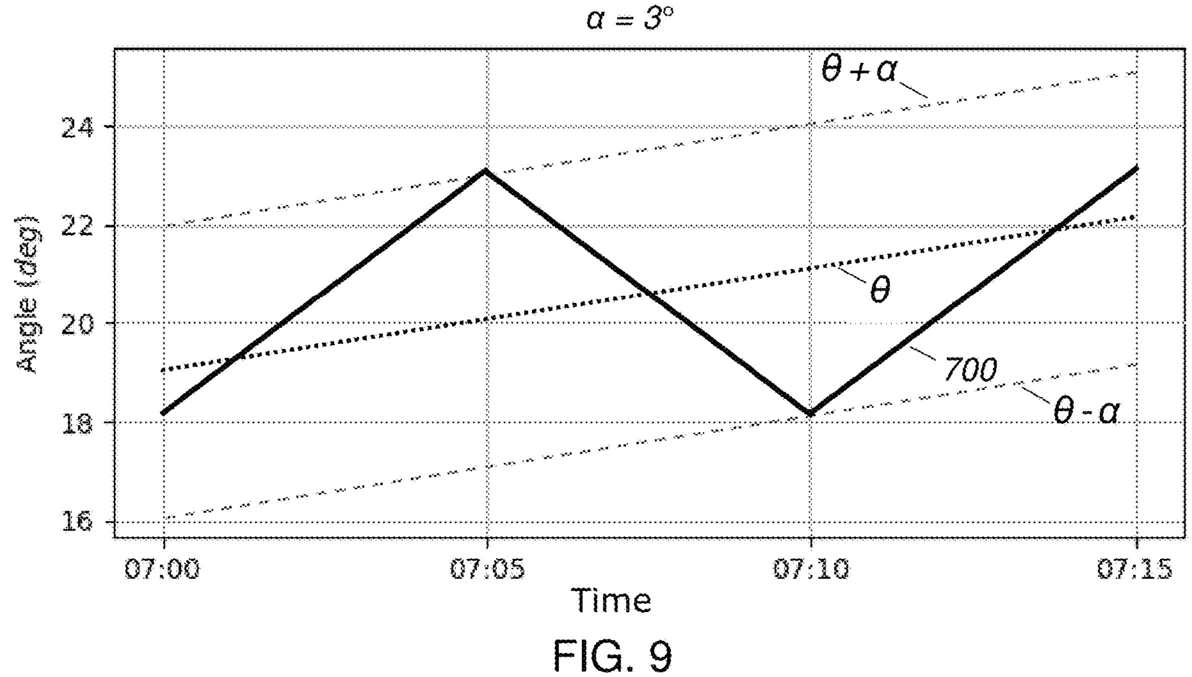

In embodiments, the selected angular error α is between −5° and +5°, or between −4° and +4°, or between −3° and +3°, or between −2° and +2°. When the calibration is successfully carried out in accordance with the method, the actual angular offset β is less than or equal to the selected angular error α. In an example, the selected angular error α is between −5° and +5°, and the angular offset β is between −5° and +5°, or between −4° and +4°, or between −3° and +3°, or between −2° and +2°. In another example, the selected angular error α is between −4° and +4°, and the angular offset β is between −4° and +4°, or between −3° and +3°, or between −2° and +2°. In another example, the selected angular error α is between −3° and +3° as illustrated in FIG. 9, and the angular offset β is between −3° and +3°, or between −2° and +2°. In another example, the selected angular error α is between −2° and +2° as illustrated in FIG. 8, and the angular offset β is between −2° and +2°. None of the foregoing should be understood to mean that the selected angular error α or the angular offset β is limited to being an integer, and as already discussed hereinabove, the ranges need not be symmetrical.

Referring again to the flowchart of FIG. 7A, Step S03 includes determining the angular offset β, based on respective irradiance-value measurements 750 obtained at a plurality of pivot angles along the actual travel path, each respective irradiance-value measurement including at least one of: irradiance and a parameter characterizing electricity produced from the irradiance, i.e., by the PV panels 55 of the PV module 57. Examples of a parameter characterizing electricity produced from the irradiance include, but not exhaustively, power, voltage and current, and a function thereof. The parameter characterizing electricity produced from the irradiance can be accessed or measured at an inverter or other electronics.

The following paragraphs describe several examples of carrying out the determining of the angular offset β of Step S03, according to embodiments.

First Example of a Method for Carrying Out Step S03

According to embodiments, a first example of carrying out the determining of the angular offset β of Step S03 includes performing the method sub-steps S03-01, S03-02, and S03-03, which are illustrated in the flowchart of FIG. 10.

Step S03-01 includes calculating, for each of one or more fixed offsets $\delta_i$ from the target travel path 700, a parallel offset path $\mathbf{710}_i$ comprising a set of respective path-offset angles for the plurality of times, each respective path-offset angle being offset, by the fixed offset $\delta_i$ from a corresponding target-path angle along the target travel path 700.

As described above, the selected angular error α in some embodiments is between −5° and +5°, or between −4° and +4°, or between −3° and +3°, or between −2° and +2°. In such embodiments, the fixed offsets δ are selected to be less than or equal to the selected angular error α. In an example, the selected angular error α is between −5° and +5°, and the fixed offsets $\delta$ are between −5° and +5°, or between −4° and +4°, or between −3° and +3°, or between −2° and +2°. In another example, the selected angular error $\alpha$ is between −4° and +4°, and the fixed offsets $\delta$ are between −4° and +4°, or between −3° and +3°, or between −2° and +2°. In another example, the selected angular error $\alpha$ is between −3° and +3° as illustrated in FIG. 9, and the fixed offsets $\delta$ are between −3° and +3°, or between −2° and +2°. In another example, the selected angular error $\alpha$ is between −2° and +2° as illustrated in FIG. 8, and the fixed offsets $\delta$ are between −2° and +2°. None of the foregoing should be understood to mean that the selected angular error $\alpha$ or the fixed offsets $\delta$ are limited to being an integer, or limited to being characterized as a symmetrical range.

In some embodiments, the one or more fixed offsets $\delta$ include at least two fixed offsets $\delta$, and the at least two fixed offsets $\delta$ include at least one positive fixed offset $\delta$ and at least negative fixed offset $\delta$.

FIG. 11A shows a schematically drawn graph of angle vs. time, illustrating certain features of Step S03-01 based on the example of FIG. 9, where the exemplary selected angular error $\alpha$ is ±3°. As in FIG. 9, the target travel path 700 of FIG. 11A includes alternating sequences of increasing angles and decreasing angles. The graph of FIG. 11 shows a non-limiting example, in terms of quantity, range, spacing and symmetry, of a number of parallel offset paths $\mathbf{710}_i$ respectively calculated for a corresponding number of fixed offsets $\delta_i$, all falling in the range of ±2° from the target travel path 700. Each of the parallel offset paths $\mathbf{710}_i$ includes a set of respective path-offset angles for the plurality of times of the travel period, each respective path-offset angle being offset, by the fixed offset $\delta_i$, from a corresponding target-path angle along the target travel path 700.

Referring again to the flowchart of FIG. 10, Step S03-02 includes fitting respective irradiance-value measurements 750 obtained at the plurality of pivot angles along the actual travel path to a best-fit parallel offset path $\mathbf{710}_{BEST}$ based on projected irradiance values for the respective path-offset angles for the plurality of times, i.e., during the travel period.

Figure 11B:
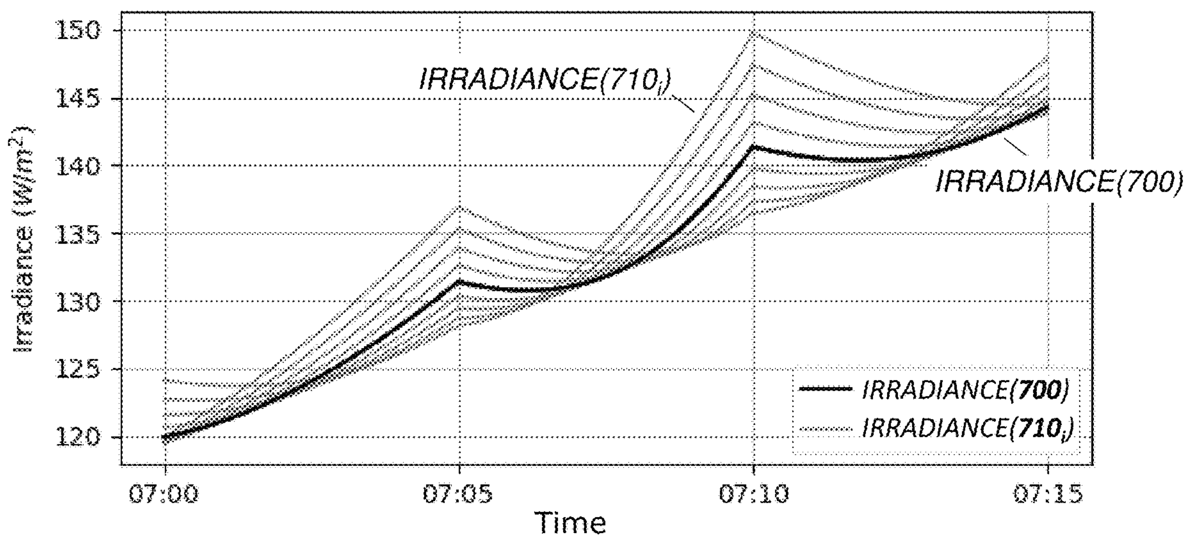
FIG. 11B shows the target travel path and calculated parallel offsets of FIG. 11A in a schematic graph of projected irradiance vs. time, according to embodiments of the present invention.
Figure 11C:
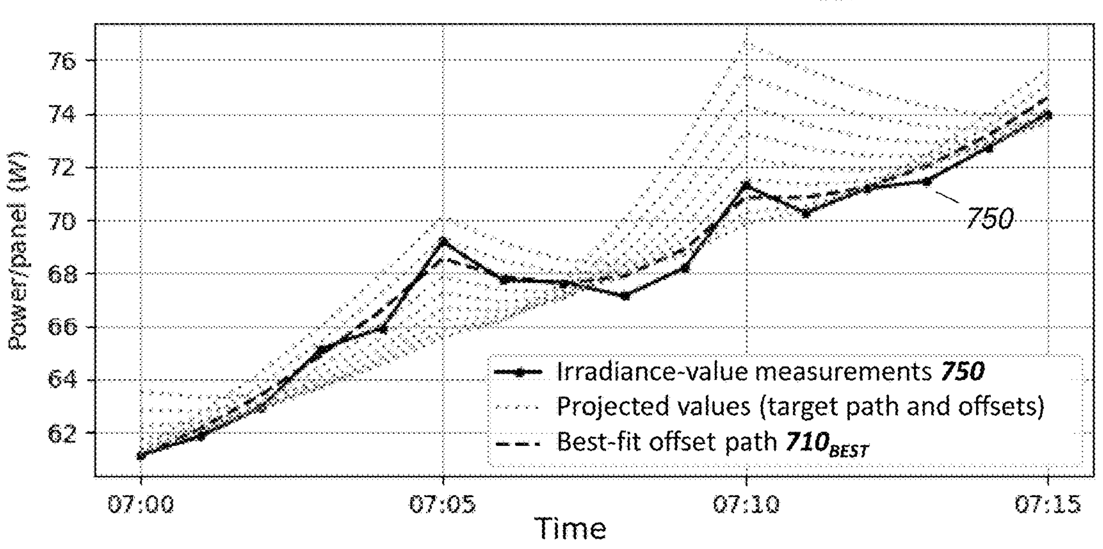
FIG. 11C shows the graph of FIG. 11B with a curve of actual irradiance-value measurements fit to one of the calculated parallel offsets, according to embodiments of the present invention.

FIGS. 11B and 11C show schematically drawn graphs illustrating certain features of Step S03-02. Both graphs use exemplary data that continues the example of FIG. 11A. The graph of FIG. 11B is a plot of irradiance vs. time, showing projected irradiance along the target travel path 700 and along each of the parallel offset paths $\mathbf{710}_i$ calculated in Step S03-01 and shown schematically in FIG. 11A. The graph of FIG. 11C is a plot of power per PV panel 55 (generated from the irradiance shown in FIG. 11B) vs. time. The projected irradiance along the target travel path 700 and along each of the parallel offset paths $\mathbf{710}_i$ shown schematically in FIG. 11B is translated to projected power generated by the irradiance, and divided by the number of PV panels 55 in the PV module 57. This graph also maps irradiance-value measurements 750 obtained for each of the plurality of times as an overlay on the data translated from FIGS. 11A and 11B; in this case, the irradiance-value measurements 750 comprise power generated from irradiance per PV panel 55. The set of irradiance-value measurements 750 is fit to one of the projected-value lines corresponding either to the original target travel path 700 or to one of the parallel offset lines $\mathbf{710}_i$. The fitting can be done by any statistical regression routine or any other mathematical means. A projected-value line is thus identified as the best fit with respect to the set of irradiance-value measurements 750 and the corresponding best-fit offset path $\mathbf{710}_{BEST}$ is identified. The skilled artisan will understand that in some cases, the best-fit projected-value line will correspond to the original target travel path, in which case there is no angular offset $\beta$, and then no calibration is effected.

Referring again to the flowchart of FIG. 10, Step S03-03 includes assigning the fixed offset of the best-fit parallel offset path $\mathbf{710}_{BEST}$ as the angular offset $\beta$.

Figure 14:
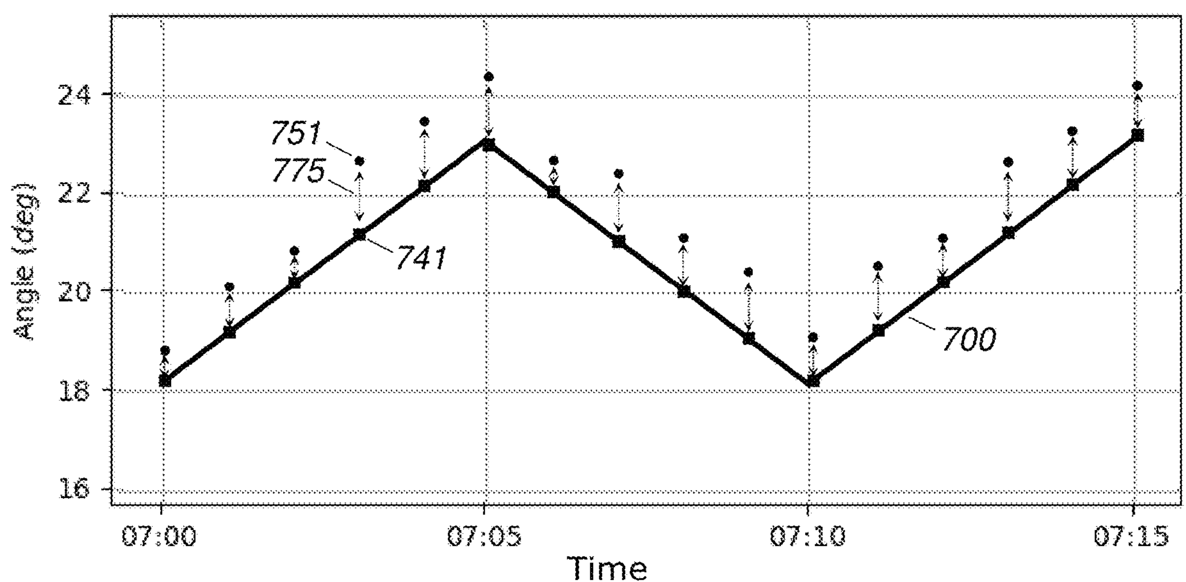
FIG. 14 shows a schematic graph of module orientation angle vs. time, illustrating the determining of an offset from differences between actual irradiance-value measurements along an actual travel path and projected values along a target travel path, according to embodiments of the present invention.
Figures 15, 16:
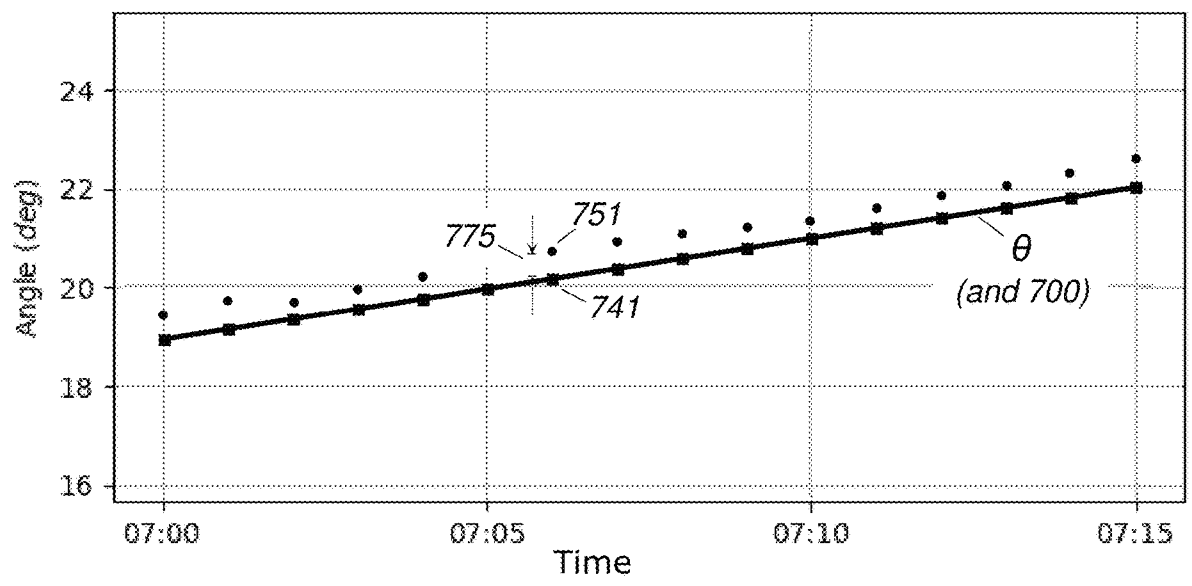
FIG. 15 shows a flowchart of third exemplary method steps for determining the angular offset of an actual travel path from a target travel path, according to embodiments of the present invention.
FIG. 16 shows a schematic graph of module orientation angle vs. time, showing a translation of irradiance-value measurements along an actual travel path in comparison with projected values along a target travel path which follows the set of calculated minimum-irradiance values, according to embodiments of the present invention.

In FIG. 11C and some graphs in subsequent figures, an exemplary number of times is shown for purposes of illustration, where each time is shown to have a corresponding irradiance-value measurement 750 and corresponding target-path angle projections 740 (e.g., in FIGS. 14 and 16). The number of specific times in the plurality of times can be selected based on any number of parameters, for example (but not exhaustively): the duration of the travel period, having enough data points for analysis and/or regression, not having too many data points to avoid overloading a controller, the degree of variability in offsets between actual pivot angles and corresponding target-path angles, and the desired precision of the determining of the angular offset $\beta$.

Second Example of a Method for Carrying Out Step S03

According to embodiments, a second example of carrying out the determining of the angular offset $\beta$ of Step S03 includes performing the method sub-steps S03-11 and S03-12, which are illustrated in the flowchart of FIG. 12.

Step S03-011 includes calculating an offset path 720 from the respective irradiance-value measurements 750 obtained at the plurality of pivot angles along the actual travel path, wherein a slope of the offset path 720 is constrained to equal a slope of the target travel path 700 or of a corresponding portion thereof.

Figure 13B:
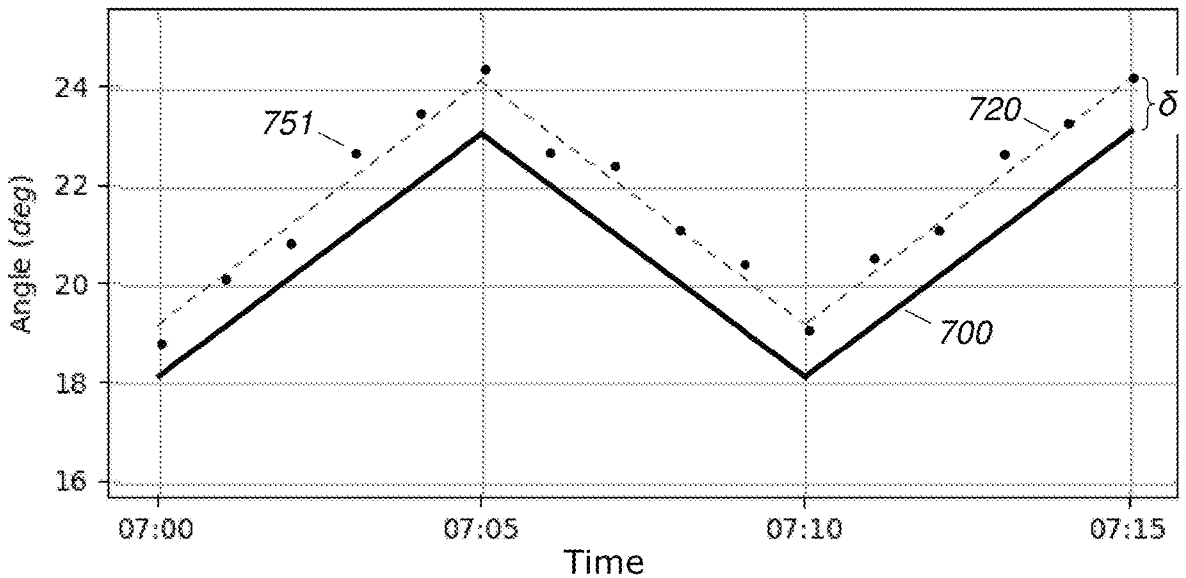
FIG. 13B shows projected angles, calculated from the irradiance-value measurements of FIG. 13A, fit to an offset path parallel to a target travel path in a schematic graph of module orientation angle vs. time, according to embodiments of the present invention.

FIGS. 13A and 13B illustrate certain features of Step S03-11, and are based upon the same target travel path 700 as that shown in FIG. 11A. FIG. 13A shows the same irradiance-value measurements 750 obtained along the actual travel path that were shown in FIG. 11C, again on a schematically drawn graph of power per PV panel vs. time, and shown with reference to projected target-path angles 740 along the target travel path 700. FIG. 13B illustrates, in a schematically drawn graph of angle vs. time, the calculating of the offset path 720, e.g., by a statistical regression analysis or by any other suitable mathematical approach. For purposes of illustration, the graph of FIG. 13B is shown as angle-vs-time graphs, where irradiance-value measurements 750 are translated to angles 751 that are projected from the irradiance-value measurements 750. The offset path 720 is constrained during the calculating to have the same slope as the target travel path 700, i.e., to remain parallel thereto, in much the same way that the calculated offset paths $\mathbf{710}_i$ of FIG. 11A are parallel to the target travel path 700. In the non-limiting example of FIG. 13B, the target travel path 700 has two slope changes during the travel period, and the calculated offset path 720 is calculated or constrained to remain parallel to all the segments of the path. Once the offset path 720 is calculated in this manner, it can be seen in FIG. 13B that the offset $\delta$ between the offset path 720 and the target travel path 700 is constant throughout the range of the travel time.

Referring again to the flowchart of FIG. 12, Step S03-012 includes assigning the offset $\delta$ of the offset path 720 from the target travel path 700 as the angular offset $\beta$.

Third Example of a Method for Carrying Out Step S03

According to embodiments, a third example of carrying out the determining of the angular offset $\beta$ of Step S03 is illustrated by the schematically drawn graph of angle vs. time shown in FIG. 14—again, for purposes of illustration, translating irradiance-value measurements 750 to angles 751 projected from the irradiance-value measurements 750. The irradiance-value measurements 750 obtained along the actual travel path are the same, for purposes of illustration, as those shown in FIG. 13B.

According to the third example, the angular offset β is determined from the differences calculated between each of the respective irradiance-value measurements 750 obtained at the plurality of pivot angles along the actual travel path and projections of irradiance 740 at corresponding target-path angles along the target travel path 700. The determining can be, for example, by taking an average of the differences or any other suitable statistical or mathematical calculation to arrive at the angular offset β. Similarly, the angular offset β can be calculated from differences between the projected angles 751 and the travel-path angles 741 along the travel path 700.

Fourth Example of a Method for Carrying Out Step S03

According to embodiments, in a fourth example of carrying out the determining of the angular offset β of Step S03, the target travel path 700 is selected to substantially follow a path comprising the set of respective minimum-irradiance angles θ. According to the fourth example, the determining of the angular offset β of Step S03 includes performing the method sub-steps S03-21 and S03-22, which are illustrated in the flowchart of FIG. 15.

Step S03-21 includes comparing respective irradiance-value measurements 750 obtained at the plurality of pivot angles along the actual travel path with a set of projected irradiance values 740 for the set of respective minimum-irradiance target angles θ.

FIG. 16 shows a schematically drawn graph of angle vs. time that illustrates certain features of Step S03-21. Again, for purposes of illustration, irradiance-value measurements 750 are translated to angles 751 projected from the irradiance-value measurements 750. The graph is based upon the same set of respective minimum-irradiance angles θ previously shown, e.g., in FIGS. 8, 9, and 11A. As shown in FIG. 16, the target travel path 700 follows the same line as the set of respective minimum-irradiance angles θ. In some embodiments according to the fourth example (not shown), the target travel path 700 is slightly offset from the set of respective minimum-irradiance angles θ but by substantially less than the selected angular error α.

In some embodiments, the comparing of Step S03-21 can include calculating a difference 775 between each of the respective irradiance-value measurements 750 obtained at the plurality of pivot angles along the actual travel path and projections of irradiance 740 at corresponding target-path angles along the target travel path 700. An overall offset can be calculated by taking an average of the differences 775 as in the third example, or by considering the respective irradiance-value measurements 750 as a linear function of time, where the function can be developed, e.g., by linear regression as in the second example.

Step S03-22 includes calculating the angular offset β based on the comparing, which as described above, can be based on mathematical measures such as a calculated average difference 775 or by a regressed offset function.

Fifth Example of a Method for Carrying Out Step S03

According to embodiments, in a fifth example of carrying out the determining of the angular offset β of Step S03, the PV module 57 pivoted in Step S02 through the actual travel path is one of a plurality of PV modules 57 in electrical connection with electrical/electronic circuitry comprising an inverter 190 and/or electrical optimization circuitry. According to the fifth example, respective irradiance-value measurements are obtained from the electrical/electronic circuitry and comprise blended irradiance-value measurements for the plurality of PV modules 57. It can be desirable to perform the calibration methods disclosed herein such that not all of the plurality of PV modules 57 are being calibrated simultaneously but rather only a subset each day, or only a single PV module of each such plurality.

It can be that irradiance-value measurements 750 along an actual travel path, needed for the calibration process, are received as combined or blended values from the inverter 190 and/or electrical optimization circuitry for the entire plurality. This can make it difficult to isolate the angular offset of a single PV module 57 within the blended results of multiple PV modules 57 all performing the disclosed calibration methods, e.g., Step S02. In contradistinction, the irradiance-value measurements 750 of a single PV module $\mathbf{57}_{CALIB}$ being calibrated can be isolated from values blending measurements of the single PV module $\mathbf{57}_{CALIB}$ and of the remaining PV modules $\mathbf{57}_{2 \ldots n}$ of the plurality if the remaining PV modules 57 are tracking the sun rather than undergoing calibration proximate to minimum-irradiance angles θ. While there can be some uncalibrated offset in the remaining PV modules $\mathbf{57}_{2 \ldots n}$ that are tracking the sun, it is possible to isolate values for the single PV module $\mathbf{57}_{CALIB}$ even when the remaining PV modules $\mathbf{57}_{2 \ldots n}$ have uncalibrated offset. Thus, according to the fifth example, the determining of the angular offset β is based on blended irradiance-value measurements for the PV module $\mathbf{57}_{CALIB}$ pivoted through said actual travel path and for at least one other PV module 57.

In some embodiments, the blended irradiance-value measurements can be used directly without isolating the irradiance-value measurements for the PV module $\mathbf{57}_{CALIB}$. In an example, the blended irradiance-value measurements are highly sensitive to the angle offset of the PV module $\mathbf{57}_{CALIB}$ close to the minimum-irradiance angle, as illustrated in FIG. 5, and much less so to the angle offsets of the other PV module 57 (which may or may not be recently calibrated).

Figures 17A, 17B, 18:
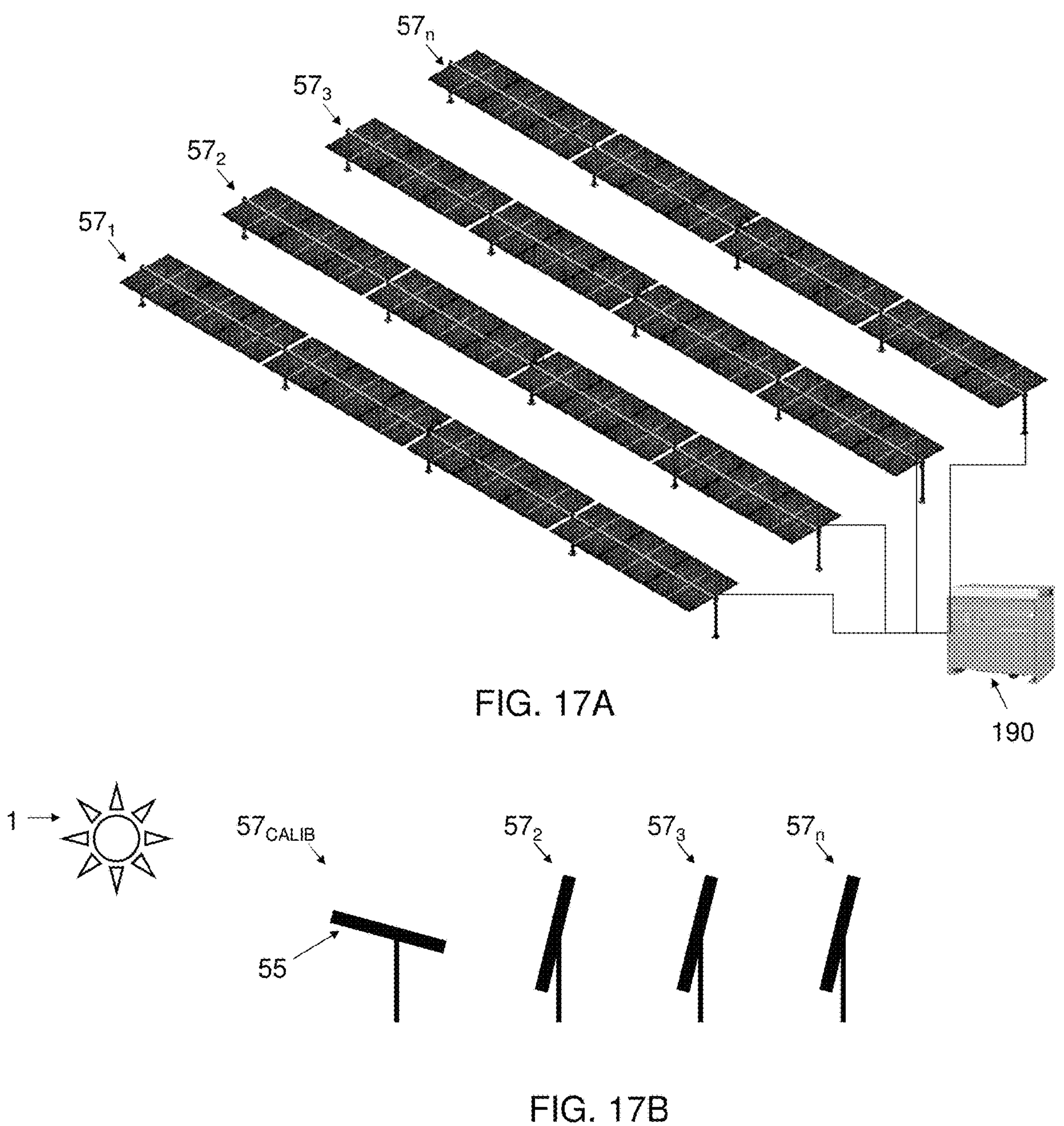
FIG. 17A schematically shows an array of pivotable PV modules in connection with a single inverter, according to embodiments of the present invention.
FIG. 17B shows schematic end-view illustrations of the PV modules of FIG. 17A, in which one but not all of the PV modules is being calibrated proximate to minimum-irradiance orientations at a particular time, according to embodiments of the present invention.
FIG. 18 shows a flowchart of fourth exemplary method step for determining the angular offset of an actual travel path from a target travel path, according to embodiments of the present invention.

FIGS. 17A and 17B schematically illustrate an example of such an arrangement. FIG. 17A shows a plurality of n PV modules 57, labeled as $\mathbf{57}_1$, $\mathbf{57}_2$, . . . $\mathbf{57}_n$, all connected to a single inverter 190. The end-view in FIG. 17B reveals that a single PV module $\mathbf{57}_{CALIB}$ is performing the pivoting of Step S02 in accordance with the calibration method, while the other PV modules $\mathbf{57}_{2 \ldots n}$ are tracking the sun.

According to the fifth example, the determining of the angular offset β of Step S03 includes performing the method sub-step S03-31, which is illustrated in the flowchart of FIG. 18.

Step S03-31 includes isolating estimated irradiance-value measurements 750 obtained at the plurality of pivot angles of the single PV module $\mathbf{57}_{CALIB}$ along the actual travel path, from the blended irradiance-value measurements.

The isolating can include projecting irradiance-value measurements for the PV modules $\mathbf{57}_{2 \ldots n}$ tracking the sun, and projecting irradiance-value measurements, including for diffuse radiation, for the single PV module $\mathbf{57}_{CALIB}$ undergoing calibration. In some applications, the uncalibrated offsets of the different PV modules $\mathbf{57}_{2 \ldots n}$ tracking the sun tend to cancel each other out to some extent, e.g., some modules can have an offset to the west and some can have an offset to the east. In some applications, the PV modules $57_{2 \ldots n}$ tracking the sun have been calibrated more recently than the single PV module $57_{CALIB}$ undergoing calibration, and therefore have relatively small uncalibrated offsets. In some applications, it is possible to temporarily isolate (e.g., disconnect) the single PV module $57_{CALIB}$ undergoing calibration electrically, so as to receive more precise irradiance values for the PV modules $57_{2 \ldots n}$ tracking the sun. In some applications, the isolation of the irradiance-value measurements for the single PV module $57_{CALIB}$ undergoing calibration is aided by the fact that the single PV module $57_{CALIB}$ undergoes more vigorous pivoting than the remaining PV modules $57_{2 \ldots n}$ tracking the sun.

FIG. 19 shows a PV module 57 arranged for two-axis tracking as part of a solar system 100 additionally comprising a motor assembly arranged to pivot the PV module 57 about at least one axis thereof through respective orientations and a control system 150, e.g., the control system 150 of FIG. 3

A double-axis, or two-axis, tracker is one that is designed to generally have the PV panels 'face' the sun directly at all times so as to capture and convert as much energy as possible from available direct irradiance by reducing the angle between a normal vector of the PV panels and incident direct irradiance to zero, or substantially zero, in not just one plane but all planes. Some double-axis trackers operate using Euler angles and do not, strictly speaking, rotate the PV panels about two Cartesian axes, but the results are substantially the same.

Referring now to FIG. 20, a method is disclosed for calibrating an angular position of a photovoltaic (PV) module 57 in a solar energy system, e.g., the solar energy system 100 of FIG. 1, or a system comprising the PV module 57 of FIG. 20. According to the method, the solar energy system comprises, in addition to one or more PV modules, a motor assembly arranged to pivot the PV module 57 about at least one axis thereof through respective orientations and a control system 150 configured to regulate the pivoting. As illustrated by the flow chart in FIG. 7A, the method comprises at least the two method steps S11, S12 and S13.

Step S11 includes calculating at least one minimum-irradiance orientation φ, ψ for each of a plurality of respective times during a travel period. This step is analogous to Step S01 but is explicitly inclusive of two-axis tracking as well as single-axis tracking.

Step S12 includes pivoting the PV module 57 through a set of actual orientations, each orientation having an angular offset β in at least one plane from a respective target orientation, the respective target orientations selected to include at least one minimum-irradiance orientation φ, ψ.

In some embodiments, the target orientations are selected to coincide with respective minimum-irradiance orientations φ, ψ for at least some of the times during a travel period. In some embodiments, a target orientation can be changed during the travel period, in response to one or more irradiance-value measurements obtained during the travel period. In some embodiments, a target orientation can be changed during the travel period, in response to one or more irradiance-value measurements obtained during the travel period.

Step S13 includes determining the angular offset β in the at least one plane, based on respective irradiance-value measurements 750 obtained at a plurality of actual orientations, each respective irradiance-value measurement 750 including at least one of irradiance and a parameter characterizing electricity produced from the irradiance. In some embodiments, the angular offset β is determined from differences between the respective irradiance-value measurements 750 obtained at the plurality of actual orientations and projections of irradiance 740 at corresponding target orientations.

In some embodiments, the determining of the angular offset β in the at least one plane of Step S13 includes performing the method sub-steps S13-01 and S13-02, which are illustrated in the flowchart of FIG. 21.

Step S13-01 includes comparing respective irradiance-value measurements 750 obtained at the plurality of actual orientations with a set of projected irradiance values 740 for the set of respective minimum-irradiance target orientations φ, ψ.

In some embodiments, the comparing of Step S13-01 can include calculating a difference 775 between each of the respective irradiance-value measurements 750 obtained at the plurality of actual orientations and projections of irradiance 740 at corresponding target orientations. An overall offset can be calculated by taking an average of the differences 775, or by considering the respective irradiance-value measurements 750 as a linear function of time, where the function can be developed, e.g., by linear regression.

Step S13-02 includes calculating the angular offset β in the at least one plane, based on the comparing, which as described above, can be based on mathematical measures such as a calculated average difference 775 or by a regressed offset function.

According to embodiments of the present invention, any of the methods and method steps disclosed herein can be performed in any combination. In some embodiments, any of the methods and method steps can be performed and/or caused to be performed by a control system 150. In some embodiments, a control system 150 of a solar system 100 is configured, e.g., programmed and/or programmable, to carry out any of the methods and method steps disclosed herein. In some embodiments, a solar system 100 comprises a control system 150 configured, e.g., programmed and/or programmable, to carry out any of the methods and method steps disclosed herein.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

The invention claimed is:

1. A method of calibrating an angular position of a photovoltaic (PV) module in a solar energy system, the solar energy system further comprising a motor assembly arranged to pivot the PV module about a longitudinal axis thereof through respective pivot angles and a control system configured to regulate the pivoting, the method comprising:

a. calculating a set of respective minimum-irradiance angles for a plurality of times during a travel period;

b. pivoting the PV module through an actual travel path having an angular offset from a target travel path, the target travel path selected to intercept, at least once, a range of angles within a selected angular error away from a respective minimum-irradiance angle; and c. determining the angular offset, based on respective irradiance-value measurements obtained at a plurality of pivot angles along the actual travel path, each respective irradiance-value measurement including at least one of irradiance and a parameter characterizing electricity produced from the irradiance.

2. The method of claim 1, wherein the determining of the angular offset includes:

i. calculating, for each of one or more fixed offsets from the target travel path, a parallel offset path comprising a set of respective path-offset angles for the plurality of times, each respective path-offset angle being offset, by the fixed offset, from a corresponding target-path angle, ii. fitting the respective irradiance-value measurements obtained at the plurality of pivot angles along the actual travel path to a best-fit parallel offset path, based on projected irradiance values for the respective path-offset angles for the plurality of times, and iii. assigning the fixed offset of the best-fit parallel offset path as the angular offset.

3. The method of claim 2, wherein the fixed offsets are selected to not exceed the selected angular error.

4. The method of claim 1, wherein the angular offset is determined from differences between the respective irradiance-value measurements obtained at the plurality of pivot angles along the actual travel path and projections of irradiance-value measurements at corresponding target-path angles along the target travel path.

5. The method of claim 1, wherein the determining of the angular offset includes:

i. calculating an offset path from the respective irradiance-value measurements obtained at the plurality of pivot angles along the actual travel path, wherein a slope of the offset path is constrained to equal a slope of the target travel path or of a corresponding portion thereof, and ii. assigning an offset of the offset path from the target travel path as the angular offset.

6. The method of claim 1, wherein the target-path angles along the target travel path consists of monotonically increasing angles or monotonically decreasing angles.

7. The method of claim 1, wherein the target-path angles along the target travel path include at least one sequence of increasing angles and at least one sequence of decreasing angles.

8. The method of claim 1, wherein i. the target travel path comprises the set of respective minimum-irradiance angles, and ii. the determining of the angular offset includes (A) comparing respective irradiance-value measurements obtained at the plurality of pivot angles along the actual travel path with a set of projected irradiance values for the set of respective minimum-irradiance target angles, and (B) calculating the angular offset based on the comparing.

9. The method of claim 1, wherein (i) the PV module pivoted through said actual travel path is one of a plurality of PV modules in electrical connection with electronic circuitry comprising an inverter, and (ii) the respective irradiance-value measurements are obtained from the electronic circuitry and comprise blended irradiance-value measurements for the plurality of PV modules.

10. The method of claim 1, wherein the determining of the angular offset is based on blended irradiance-value measurements for the PV module pivoted through said actual travel path and for at least one other PV module.

11. The method of claim 9, wherein the determining comprises isolating estimated irradiance-value measurements for the plurality of pivot angles along the actual travel path from the blended irradiance-value measurements.

12. A control system for a solar energy system, configured to carry out the method of claim 1.

13. A solar energy system comprising an array of photovoltaic (PV) modules, one or more motor assemblies arranged to pivot the PV modules about respective longitudinal axes thereof through respective pivot angles, and the control system of claim 12.

14. A method of calibrating an angular position of a photovoltaic (PV) module in a solar energy system, the solar energy system further comprising a motor assembly arranged to pivot the PV module about at least one axis thereof through respective orientations and a control system configured to regulate the pivoting, the method comprising:

a. calculating at least one minimum-irradiance orientation for each of a plurality of respective times during a travel period;

b. pivoting the PV module through a set of actual orientations each having an angular offset in at least one plane from a respective target orientation, the respective target orientations selected to include at least one minimum-irradiance orientation; and c. determining the angular offset in the at least one plane, based on respective irradiance-value measurements obtained at a plurality of actual orientations, each respective irradiance-value measurement including at least one of irradiance and a parameter characterizing electricity produced from the irradiance.

15. The method of claim 14, wherein the angular offset is determined from differences between the respective irradiance-value measurements obtained at the plurality of actual orientations and projections of irradiance at corresponding target orientations.

16. The method of claim 14, wherein i. the target orientations comprise the set of at least one respective minimum-irradiance orientation for each of the plurality of respective times, and ii. the determining of the angular offset in the at least one plane includes (A) comparing respective irradiance-value measurements obtained at the plurality of actual orientations with a set of projected irradiance values for the set of respective minimum-irradiance target orientations, and (B) calculating the angular offset in the at least one plane, based on the comparing.

17. The method of claim 14, wherein a target orientation is changed during the travel period in response to one or more obtained irradiance-value measurements.

18. The method of claim 14, wherein the set of actual orientations is changed during the travel period in response to one or more obtained irradiance-value measurements.

19. A control system for a solar energy system, configured to carry out the method of claim 14.

20. A solar energy system comprising an array of photovoltaic (PV) modules, one or more motor assemblies arranged to pivot the PV module about at least one axis thereof through respective orientations, and the control system of claim 19.

* * * * *